US011926129B2

(12) United States Patent
Adachi et al.

(10) Patent No.: US 11,926,129 B2
(45) Date of Patent: Mar. 12, 2024

(54) PREPREG LAMINATE, METHOD FOR MANUFACTURING FIBER-REINFORCED PLASTIC USING PREPREG LAMINATE, AND FIBER-REINFORCED PLASTIC

(71) Applicant: Toray Industries, Inc., Tokyo (JP)

(72) Inventors: Kentaro Adachi, Ehime (JP); Yuzo Fujita, Ehime (JP); Takuya Karaki, Ehime (JP)

(73) Assignee: Toray Industries, Inc., Tokyo (JP)

( * ) Notice: Subject to any disclaimer, the term of this patent is extended or adjusted under 35 U.S.C. 154(b) by 402 days.

(21) Appl. No.: 16/635,672

(22) PCT Filed: Jul. 3, 2018

(86) PCT No.: PCT/JP2018/025198
§ 371 (c)(1),
(2) Date: Jan. 31, 2020

(87) PCT Pub. No.: WO2019/031111
PCT Pub. Date: Feb. 14, 2019

(65) Prior Publication Data

US 2021/0122136 A1 Apr. 29, 2021

(30) Foreign Application Priority Data

Aug. 10, 2017 (JP) .................. 2017-154960

(51) Int. Cl.
*B32B 3/10* (2006.01)
*B29C 70/08* (2006.01)
*C08J 5/24* (2006.01)

(52) U.S. Cl.
CPC ............. *B32B 3/10* (2013.01); *B29C 70/081* (2013.01); *C08J 5/243* (2021.05); *C08J 2363/00* (2013.01)

(58) Field of Classification Search
CPC . B32B 3/10; B32B 2250/05; B32B 2260/021; B32B 5/028; B32B 5/06;
(Continued)

(56) References Cited

U.S. PATENT DOCUMENTS

2010/0092770 A1\* 4/2010 Wadahara ............. B29C 70/025
156/278
2013/0095282 A1 4/2013 Taketa et al.
(Continued)

FOREIGN PATENT DOCUMENTS

EP 3369768 A1 9/2018
JP 2002284901 A 10/2002
(Continued)

OTHER PUBLICATIONS

International Search Report and Written Opinion for International Application No. PCT/JP2018/025198, dated Oct. 2, 2018, 9 pages.
(Continued)

*Primary Examiner* — Brian Handville
(74) *Attorney, Agent, or Firm* — Buchanan Ingersoll & Rooney PC

(57) ABSTRACT

A prepreg laminate is provided which includes: a woven fabric prepreg on at least one surface layer; and a discontinuous fiber prepreg; the woven fabric prepreg including reinforcing fibers $R_1$ having a woven structure, and a thermosetting resin A, the discontinuous fiber prepreg including unidirectionally oriented discontinuous reinforcing fibers $R_2$ and a thermosetting resin B, the thermosetting resin A and the thermosetting resin B satisfying the following calorific value condition: calorific value condition: when each of the thermosetting resin A and the thermosetting resin B is heated using a differential scanning calorimeter from 50° C. to 130° C. at 700° C./min under a nitrogen atmosphere followed by retention at 130° C. until completion of thermal curing
(Continued)

reaction, Tb−Ta>30, wherein Ta (s): time required for the calorific value of the thermosetting resin A to reach 50% of the gross calorific value of the thermosetting resin A; Tb (s): time required for calorific value of the thermosetting resin B to reach 50% of gross calorific value of the thermosetting resin B.

9 Claims, 7 Drawing Sheets

(58) Field of Classification Search
 CPC .... B32B 5/08; B32B 5/10; B32B 5/12; B32B 5/26; B32B 7/05; B32B 27/12; B32B 2250/20; B32B 2260/046; B32B 2262/0269; B32B 2262/10; B32B 2262/101; B32B 2262/106; B32B 2262/14; B32B 2307/518; B32B 2307/732; B32B 2457/00; B32B 2605/08; B32B 2605/10; B32B 2605/12; B32B 2605/18; B32B 5/024; B32B 27/20; B32B 2305/076; B29C 70/081; B29C 70/345; C08J 5/24; C08J 2363/00; D06M 17/00
 See application file for complete search history.

(56) References Cited

U.S. PATENT DOCUMENTS

2017/0239895 A1   8/2017  Takehara et al.
2017/0283571 A1*  10/2017  Taketa .................. B32B 15/085

FOREIGN PATENT DOCUMENTS

| JP | 2005238520 A | 9/2005 | |
|---|---|---|---|
| JP | 2007261141 A | 10/2007 | |
| JP | 2008207544 A | 9/2008 | |
| JP | 2016078452 A | 5/2016 | |
| WO | WO-2016043156 A1 * | 3/2016 | ............. B32B 15/08 |
| WO | WO-2016060062 A1 * | 4/2016 | ........... B29C 70/086 |
| WO | 2017073460 A1 | 5/2017 | |

OTHER PUBLICATIONS

Extended European Search Report for European Application No. 18 843 346.0, dated Apr. 6, 2021, 9 pages.

* cited by examiner

PREPREG LAMINATE, METHOD FOR MANUFACTURING FIBER-REINFORCED PLASTIC USING PREPREG LAMINATE, AND FIBER-REINFORCED PLASTIC

CROSS REFERENCE TO RELATED APPLICATIONS

This is the U.S. National Phase application of PCT/JP2018/025198, filed Jul. 3, 2018, which claims priority to Japanese Patent Application No. 2017-154960, filed Aug. 10, 2017, the disclosure of these applications being incorporated herein by reference in their entireties for all purposes.

FIELD OF THE INVENTION

The present invention relates to a prepreg laminate, a method of producing a fiber-reinforced plastic using a prepreg laminate, and a fiber-reinforced plastic.

BACKGROUND OF THE INVENTION

Fiber-reinforced plastics composed of reinforcing fibers and resins have excellent mechanical properties due to their high specific strengths and specific moduli, and also have excellent functional characteristics in weather resistance, chemical resistance, and the like. Because of these and other reasons, those plastics are attracting attention in terms of industrial uses, and their uses have expanded to structural uses for aircraft, spacecraft, automobiles, railways, ships, electric appliances, sports, and the like. Thus, demand for those plastics is increasing year by year. The reduction of the cost and the surface-quality-improving techniques achieved in recent years have led to attempts in use of fiber-reinforced plastics for outer plate members of carriers such as aircraft and automobiles.

In molding of an outer plate member with a fiber-reinforced plastic, there are cases where a woven fabric prepreg composed of reinforcing fibers having a woven structure and a resin is arranged on a surface of the fiber-reinforced plastic (Patent Document 1). Geometric shapes of the woven structure are appreciated as designs, and plain weave, twill weave, and the like are used depending on preference.

In cases where sufficient mechanical properties cannot be realized by the woven fabric prepreg alone, a unidirectional continuous fiber prepreg is laminated to complement the insufficient mechanical properties in some cases (Patent Document 2).

Further, materials prepared by making incisions to a prepreg composed of unidirectionally oriented reinforcing fibers and a matrix resin, the materials having shape conformity during molding while having mechanical properties after molding, have been proposed (for example, Patent Document 3). In these materials, since the reinforcing fibers contained in the prepreg are cut by the incisions, they have excellent shape conformity during molding. Therefore, they can be used for production of fiber-reinforced plastics having complicated shapes.

PATENT DOCUMENTS

[Patent Document 1] JP 2002-284901 A
[Patent Document 2] JP 2007-261141 A
[Patent Document 3] JP 2008-207544 A

SUMMARY OF THE INVENTION

However, in the techniques disclosed in Patent Document 1 and Patent Document 2, the reinforcing fibers used are continuous fibers. Therefore, they are not suitable for molding of members having complicated shapes such as uneven shapes.

Moreover, in cases where a fiber-reinforced plastic is produced using a woven fabric prepreg in combination with a discontinuous fiber prepreg such as an incised prepreg having high shape conformity as disclosed in Patent Document 3, significant disorder of the woven structure occurs to cause disorder of the original woven structure since, for example, under the influence of the flow of the incised prepreg, reinforcing fiber bundles constituting the woven structure of the woven fabric prepreg move in the direction perpendicular to the fiber orientation direction, or the fiber bundle width changes, which is problematic.

Thus, an object of the present invention is to provide a prepreg laminate that shows less disorder of the woven structure during molding even by combination of a woven fabric prepreg with a discontinuous fiber prepreg, a fiber-reinforced plastic which has a good external appearance quality and is suitable as an outer plate member, and a method of producing the fiber-reinforced plastic.

In order to solve the above problems, the prepreg laminate of the present invention has the following constitution. That is, a prepreg laminate comprising: a woven fabric prepreg arranged on at least one surface layer; and a discontinuous fiber prepreg arranged;

the woven fabric prepreg containing reinforcing fibers $R_1$ having a woven structure, and a thermosetting resin A, the discontinuous fiber prepreg containing unidirectionally oriented discontinuous reinforcing fibers $R_2$ and a thermosetting resin B, the thermosetting resin A and the thermosetting resin B satisfying the following calorific value condition.

Calorific value condition: when each of the thermosetting resin A and the thermosetting resin B is heated using a differential scanning calorimeter from 50° C. to 130° C. at 700° C./min under a nitrogen atmosphere followed by retention at 130° C. until completion of thermal curing reaction, $$Tb-Ta>30$$

wherein

Ta(s): time required for the calorific value of the thermosetting resin A to reach 50% of the gross calorific value of the thermosetting resin A;

Tb(s): time required for calorific value of the thermosetting resin B to reach 50% of gross calorific value of the thermosetting resin B.

The method of producing a fiber-reinforced plastic using the prepreg laminate of the present invention has the following constitution. That is, a method of producing a fiber-reinforced plastic using the prepreg laminate, the method comprising:

an arrangement step of arranging the prepreg laminate;

a preheating step of preheating the prepreg laminate; and a molding step of heating and pressurizing the prepreg laminate to prepare a fiber-reinforced plastic.

The fiber-reinforced plastic of the present invention has the following constitution. That is, a fiber-reinforced plastic comprising:
a layer $L_1$ containing reinforcing fibers having a woven structure and a resin; and plural layers $L_2$ containing reinforcing fibers and a resin;
wherein
the layer $L_1$ and the plurality of layers $L_2$ form a laminate structure;
the layer $L_1$ is present on at least one surface layer; and
the layer $L_1$ has a fiber flow ratio of 1.0 to 5.0 in terms of the following fiber flow ratio.
Fiber flow ratio: $h_{max}/h_{min}$
wherein
h represents the fiber bundle width of the reinforcing fibers having a woven structure;
$h_{max}$ represents the maximum value of h; and
$h_{min}$ represents the minimum value of h.

In the prepreg laminate of the present invention, the discontinuous fiber prepreg is preferably an incised prepreg prepared by making plural incisions to a prepreg containing unidirectionally oriented reinforcing fibers and the thermosetting resin B, to form the reinforcing fibers into the discontinuous reinforcing fibers $R_2$.

In the prepreg laminate of the present invention, substantially all the reinforcing fibers in the discontinuous fiber prepreg are preferably cut by the incisions, and the average length of the incisions, x, and the average length of the discontinuous reinforcing fibers $R_2$ cut by the incisions, y, preferably satisfy y<6x+10.

In the prepreg laminate of the present invention, substantially all the reinforcing fibers in the discontinuous fiber prepreg are preferably cut by the incisions, and the average length of the incisions, x, and the average length of the discontinuous reinforcing fibers $R_2$ cut by the incisions, y, preferably satisfy y≥6x+10.

In the prepreg laminate of the present invention, the surface area of each lamination plane in the discontinuous fiber prepreg is preferably not less than 80% and less than 100% with respect to 100% of the surface area of the outer surface of the woven fabric prepreg arranged on at least one surface layer.

In the method of producing a fiber-reinforced plastic using the prepreg laminate of the present invention, when one surface of the prepreg laminate is formed with the discontinuous fiber prepreg, the plane of the mold for molding in contact with the discontinuous fiber prepreg preferably has a surface area of more than 100% and less than 200% with respect to 100% of the surface area of the plane, in contact with the mold for molding, of the discontinuous fiber prepreg arranged on the surface.

In the fiber-reinforced plastic of the present invention, the fiber length of the discontinuous reinforcing fibers contained in the layer $L_2$ is preferably 1 to 100 mm.

In the fiber-reinforced plastic of the present invention, the following dispersion parameter measured for each layer $L_2$ in a cross-section obtained by cutting the laminate structure in the lamination direction is preferably not more than 10%.

Dispersion parameter: the standard deviation/the average of 100 major axes obtained by elliptical approximation of cross-sectional shapes of 100 randomly extracted reinforcing fibers.

In the fiber-reinforced plastic of the present invention, when the average of 100 diameters (major axes, in cases of ellipses) obtained by elliptical approximation of cross-sectional shapes of 100 randomly extracted reinforcing fibers in one layer $L_2$ in a cross-section obtained by cutting the laminate structure at an arbitrary position in the lamination direction is defined as $D_1$, and the average of 100 major axes obtained by elliptical approximation of cross-sectional shapes of 100 randomly extracted reinforcing fibers in another layer $L_2$ in the cross-section in the lamination direction is defined as $D_2$, $D_1$ is preferably not less than two times larger than $D_2$.

Preferably, the fiber-reinforced plastic of the present invention comprises plural layers $L_2$, wherein the average length of discontinuous reinforcing fibers contained in one layer $L_2$ is smaller than the average length of discontinuous reinforcing fibers contained in another layer $L_2$.

According to the present invention, a prepreg laminate that shows less disorder of the woven structure during molding even by combination of a woven fabric prepreg with a discontinuous fiber prepreg can be obtained. Further, a fiber-reinforced plastic suitable as an outer plate member can be obtained, and a method of producing the fiber-reinforced plastic can be provided.

DETAILED DESCRIPTION OF EMBODIMENTS OF THE INVENTION

Figure 1:
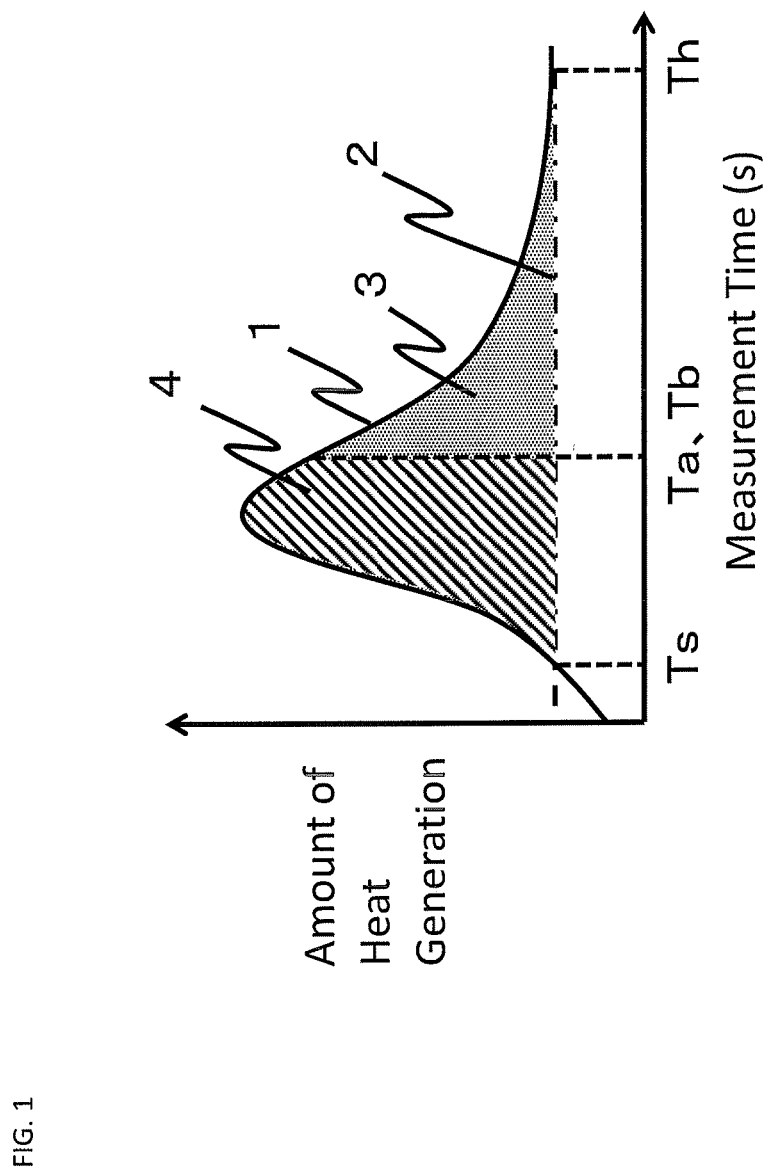
FIG. 1 is an example of the heat flow curve obtained as a result of differential scanning calorimetry.

In the present invention, the above problem can be solved by using a laminate of a woven fabric prepreg and a discontinuous fiber prepreg in which the thermosetting resin A contained in the woven fabric prepreg has a sufficiently shorter hardening time compared to that of the thermosetting resin B contained in the discontinuous fiber prepreg. More specifically, the thermosetting resin A and the thermosetting resin B have the following relationship: when each of these resins is analyzed by heating using a differential scanning calorimeter from 50° C. to 130° C. at 700° C./min under a nitrogen atmosphere followed by retention at 130° C. until completion of thermal curing reaction, the time required for the calorific value of the thermosetting resin A to reach 50% of the gross calorific value of the thermosetting resin A, Ta(s), and the time required for the calorific value of the thermosetting resin B to reach 50% of the gross calorific value of the thermosetting resin B, Tb(s), need to satisfy the relationship of Tb−Ta>30 (hereinafter referred to as calorific value condition). In cases where Tb−Ta≤30, the difference in the cure rate between the thermosetting resin A and the thermosetting resin B is substantially small, so that effective suppression of the disorder of the woven structure cannot be expected.

In cases where the above relationship is satisfied, the thermosetting resin A is cured sufficiently more quickly compared to the thermosetting resin B. Therefore, at the time when the viscosity of the thermosetting resin B decreases due to heating to cause flow of the discontinuous reinforcing fibers $R_2$ contained in the discontinuous fiber prepreg, the viscosity of the thermosetting resin A is sufficiently high, so that flow of the reinforcing fibers $R_1$ contained in the woven fabric prepreg is suppressed, resulting in suppression of the disorder of the woven structure. For more effective suppression of the disorder of the woven structure, the thermosetting resin A and the thermosetting resin B are preferably selected such that Tb−Ta>150 is satisfied. On the other hand, the maximum value of Tb−Ta is realistically 1,000.

The woven fabric prepreg in the present invention is a prepreg containing reinforcing fibers $R_1$ having a woven structure, and a thermosetting resin A.

Examples of the reinforcing fibers $R_1$ include glass fibers, kevlar fibers, carbon fibers, graphite fibers, boron fibers, and aramid fibers. Among these reinforcing fibers, carbon fibers are especially preferred since they are light and have particularly excellent properties in the specific strength and the specific modulus.

The woven fabric may be composed of one kind of fibers, or may be composed of plural kinds of fibers. The woven fabric may be appropriately selected from those constituted by plural fiber bundles. Examples of the woven fabric that may be used include unidirectional woven fabrics in which plural fiber bundles unidirectionally aligned such that they are parallel to each other, and auxiliary fibers perpendicular thereto, are crossed with each other to form a woven structure, biaxial fabrics in which plural fiber bundles are woven in two directions, and multi-axis fabrics in which fiber bundles aligned parallel to each other are laminated to form plural stages such that the stages have different fiber directions, followed by joining them together by stitching or the like. In particular, biaxial fabrics composed of fiber bundles perpendicular to each other are preferred because of their excellent conformity to three-dimensional shapes. The shape of the woven structure of the woven fabric prepreg is not limited, and examples thereof include a variety of woven shapes such as plain weave, twill weave, long shaft weave, leno weave, mock leno weave, and twill weave. The fiber bundles constituting the woven fabric may have a uniform width among all the fiber bundles, or the width may vary among the fiber bundles. The number of the fiber filaments constituting each fiber bundle is not limited. From the viewpoint of ease of handling, the number of the fiber filaments is preferably 1,000 to 12,000. The number of the fiber filaments is more preferably 1,000 to 5,000 since disorder of the woven structure of the woven fabric is less apparent in such cases.

The thermosetting resin A is not limited as long as it is a thermosetting resin satisfying the above calorific value condition. Examples thereof include unsaturated polyester resins, vinyl ester resins, epoxy resins, benzoxazine resins, phenol resins, thiourea resins, melamine resins, and polyimide resins. Products obtained by modification of these resins using modifiers, and blended resins of two or more of these may also be used. These thermosetting resins may be resins whose self-curing occurs upon heating, or may be resins containing a hardener, a curing accelerator, or the like. The resins may also contain a filler or the like for the purpose of improving heat resistance and mechanical properties.

The discontinuous fiber prepreg in the present invention is composed of unidirectionally oriented discontinuous reinforcing fibers and a matrix resin. More specifically, the discontinuous fiber prepreg may be an incised prepreg prepared by making plural incisions in a prepreg containing unidirectionally oriented reinforcing fibers and a thermosetting resin B, wherein the incisions are made in a direction in which the reinforcing fibers are cut, or may be a sheet-shaped base material obtained by cutting a unidirectional prepreg into small pieces and arranging the pieces such that the fiber direction is the same and such that the pieces do not overlap with each other. The discontinuous fiber prepreg may also be a prepreg prepared by impregnating, with a resin, a fiber base material prepared by unidirectionally aligning recycled fibers with running water. The discontinuous fiber prepreg may also be a prepreg prepared by intermittently breaking fibers by drawing a fiber base material, and then impregnating the resulting base material with a resin. By forming the reinforcing fibers into discontinuous reinforcing fibers $R_2$, the prepreg laminate can be conformed to a curved surface, or the discontinuous fiber prepreg can be allowed to flow to provide a rib. Thus, a fiber-reinforced plastic having a complicated shape can be obtained.

Examples of the material of the discontinuous reinforcing fibers $R_2$ include, but are not limited to, glass fibers, kevlar fibers, carbon fibers, graphite fibers, boron fibers, and aramid fibers. Among these reinforcing fiber materials, carbon fibers are especially preferred since they are light and have particularly excellent properties in the specific strength and the specific modulus.

The thermosetting resin B is not limited as long as it is a thermosetting resin satisfying the above calorific value condition. Examples thereof include unsaturated polyester resins, vinyl ester resins, epoxy resins, benzoxazine resins, phenol resins, thiourea resins, melamine resins, and polyimide resins. Products obtained by modification of these resins using modifiers, and blended resins of two or more of these may also be used. These thermosetting resins may be resins whose self-curing occurs upon heating, or may be resins containing a hardener, a curing accelerator, or the like. The resins may also contain a filler or the like for the purpose of improving heat resistance and mechanical properties.

As the thermosetting resin A and the thermosetting resin B, an epoxy resin(s) is/are preferably used. By the use of an epoxy resin(s), a fiber-reinforced plastic having better mechanical properties and heat resistance can be obtained.

The volume fraction (Vf) of the discontinuous reinforcing fibers in the discontinuous fiber prepreg is not limited, and may be appropriately selected. For realizing sufficient mechanical properties and shape conformity, Vf is preferably 40 to 65%.

The following description is given especially for cases where the discontinuous fiber prepreg is an incised prepreg. By forming the discontinuous fibers into an incised prepreg, a discontinuous fiber prepreg having accurate unidirectionality and a high fiber fraction can be obtained.

Regarding the method of producing an incised prepreg by making incisions in the unidirectionally oriented reinforcing fibers, the incised prepreg may be produced by pushing a prepreg onto a rotary blade roller having a blade attached to its surface, by intermittently pressing a prepreg using a Thomson blade, or by cutting the reinforcing fibers using a laser.

In the present invention, substantially all the reinforcing fibers in the incised prepreg are preferably cut by incisions for giving good shape conformity. The term "substantially all the reinforcing fibers are cut by incisions" means that not less than 95% of the continuous reinforcing fibers are cut by incisions in terms of the number of the fibers. Whether or not substantially all the reinforcing fibers in the incised prepreg are cut by incisions is confirmed by extracting a representative sample with a width of 1 cm, and regarding reinforcing fibers having a length of not less than 10 cm as continuous fibers. More specifically, first, a small piece of 1 cm×1 cm is excised from an arbitrary position in one layer of the incised prepreg such that the small piece has a cross-section perpendicular to the fiber direction of the reinforcing fibers. The small piece is then cured, and the cross-section perpendicular to the fiber direction of the reinforcing fibers is ground, followed by obtaining an image of the cross-section. Thereafter, the reinforcing fiber portions and the resin portions are digitized by image processing, and the number of reinforcing fibers (N1) contained in the cross-section is counted. Subsequently, at an arbitrary position in one layer of the incised prepreg, a portion of 20 cm×1 cm is excised such that the distance of the reinforcing fibers in the fiber direction is 20 cm and such that the portion has a cross-section perpendicular to the fiber direction of the reinforcing fibers, and the resin is then burned off at high temperature (burn-off method). The temperature for the burn-off of the resin varies depending on the resin type. The temperature is, for example, 500° C. in cases of an epoxy resin. Thereafter, for the residual reinforcing fibers, the number of reinforcing fibers having a length of not less than 10 cm (N2) is counted. In cases where N2 is not more than 5% of N1, it is regarded that not less than 95% of the continuous fibers were cut by the incisions in terms of the number of the fibers.

In cases where an incised prepreg is formed by the making incisions in a prepreg, the incised prepreg contains reinforcing fibers with discontinuous fiber lengths, so that high shape conformity can be achieved during molding. As a result, the incised prepreg flows during heating and pressurization, and a fiber-reinforced plastic which conforms to the mold and has a complicated shape can be produced.

The incision angle of the incisions made in the incised prepreg is preferably $0° \leq \theta < 45°$ in terms of the absolute value of the incision angle $\theta$ when the direction of orientation of the fibers is regarded as $0°$. The incision angle is more preferably $2° \leq \theta < 25°$ for obtaining a good surface quality. The length of each incision to be made in the incised prepreg, X, is preferably $0.1 \text{ mm} \leq X < 50 \text{ mm}$, more preferably $0.5 \text{ mm} \leq X < 10 \text{ mm}$. In cases where the length of the incision, X, is within the preferred range, the openings of the incisions on the resulting fiber-reinforced plastic are not apparent, and deterioration of the surface quality can therefore be prevented.

In the present invention, the length of the discontinuous reinforcing fiber $R_2$ contained in the discontinuous fiber prepreg, Y, is preferably $1 \text{ mm} \leq Y < 100 \text{ mm}$. The length is more preferably $10 \text{ mm} \leq Y < 50 \text{ mm}$ from the viewpoint of realizing good mechanical properties. In cases where the length of the discontinuous reinforcing fiber $R_2$, Y, is within the preferred range, sufficient mechanical properties of the resulting fiber-reinforced plastic can be realized while the shape conformity during molding is not deteriorated.

The prepreg laminate in the present invention can be obtained by laminating the woven fabric prepreg and the discontinuous fiber prepreg together. Since the prepreg laminate according to the present invention has the woven fabric prepreg on at least one surface layer, good mechanical properties and surface quality of the fiber-reinforced plastic can be realized. Except for this, the laminate constitution of the prepreg laminate is not limited, and the lamination may be carried out in an arbitrary manner depending on the use. Regarding representative examples of the laminate constitution of the prepreg laminate, the discontinuous fiber prepreg may be quasi-isotropically laminated at [+45°/0°/−45°/90°]s with respect to the fiber direction of the reinforcing fibers, which is regarded as 0°, and then the woven fabric prepreg may be laminated on at least one surface of the laminate to prepare a prepreg laminate. Alternatively, the discontinuous fiber prepreg may be laminated with a cross-ply laminate constitution of $[0°/90°]_{2S}$, and then the woven fabric prepreg may be laminated on at least one surface of the laminate to prepare a prepreg laminate. The prepreg laminate may have the woven fabric prepreg on both surfaces. When necessary, the prepreg laminate may also contain another sheet-shaped base material such as a unidirectional continuous fiber prepreg or a resin sheet.

In the present invention, the cure rate of the thermosetting resin B contained in the discontinuous fiber prepreg is preferably higher than the cure rate of the thermosetting resin A contained in the woven fabric prepreg, from the viewpoint of suppressing disorder of the woven structure of the woven fabric during molding.

A heat flow observed with a differential scanning calorimeter (DSC) is caused by reaction of a thermosetting resin, and the time before the appearance of the heat flow in isothermal measurement by DSC can be used as a standard for judging the reaction rate of the thermosetting resin. More specifically, the peak top of the heat flow that appears in isothermal measurement by DSC (hereinafter referred to as peak top) indicates the state where crosslinking reaction of the thermosetting resin is most activated, and can be used as an index of the cure rate. However, since the peak top largely depends on conditions of the DSC measurement, it has been difficult to obtain a reproducible value in some cases. In view of this, the present invention employed evaluation based on the gross calorific value as an index of the cure rate since a reproducible value can be stably obtained therewith.

The evaluation method in the present invention is described below in detail.

FIG. 1 schematically shows one example of a heat flow curve 1 obtained as a result of heat generation due to curing in DSC measurement of a resin sample under the above conditions. The area surrounded by an arbitrary base line 2 and the heat flow curve 1 represents the heat generation due to the curing reaction, and the area 3 corresponds to the gross calorific value. The reaction completion time Th and the reaction start time Ts in FIG. 1 are defined as follows. The reaction completion time Th is defined as the time when the calorific value becomes minimum during the period after the peak top and before completion of the measurement. The base line 2 is the straight line drawn horizontally from the heat flow at Th. The time at the point where the base line 2 and the heat flow curve 1 intersect for the first time after the beginning of the measurement is defined as the reaction start time Ts. For each of the thermosetting resin A and the thermosetting resin B, calorimetric analysis is carried out to obtain the heat flow curve 1, and the gross calorific value is calculated. The time when the cumulative calorific value 4 after the reaction start time Ts exceeds 50% with respect to 100% of the gross calorific value for the first time is defined as semi-hardening time Ta or Tb. Here, the semi-hardening time of the thermosetting resin A is represented as Ta, and the semi-hardening time of the thermosetting resin B is represented as Tb. A smaller value of Ta or Tb indicates quicker completion of half of the curing reaction, which means that the curing proceeds at a higher rate.

The prepreg laminate of the present invention may have a planar shape, but does not need to have a planar shape. In cases where the prepreg laminate has a planar shape, a prepreg laminate prepared by laminating a discontinuous fiber prepreg on a woven fabric prepreg is molded into a fiber-reinforced plastic having a complicated shape by heating and pressurization means such as press molding or autoclave molding. Here, the term "heating and pressurization" according to the present invention means heating which is carried out while a pressure is applied. In cases where the prepreg laminate has a nonplanar shape, the term means that the woven fabric prepreg and the discontinuous fiber prepreg are laminated in order while they are formed with a mold, to prepare a prepreg laminate. The prepreg laminate of the present invention also includes modes in which the woven fabric prepreg and the discontinuous fiber prepreg do not completely adhere to each other in these cases.

In a mode of the prepreg laminate of the present invention, the prepreg laminate preferably contains an incised prepreg in which substantially all the reinforcing fibers in the incised prepreg are cut by the incisions, and in which the average length of the incisions, x, and the average length of the discontinuous reinforcing fibers $R_2$ cut by the incisions, y, satisfy $y<6x+10$.

Figure 2:
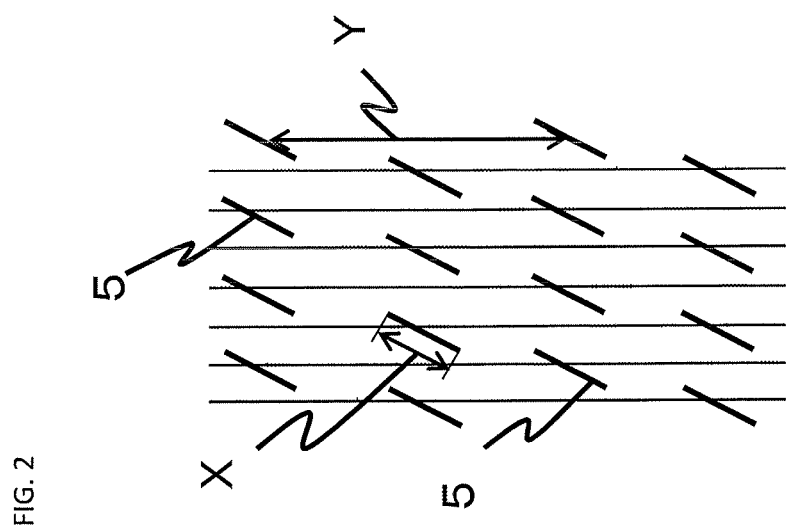
FIG. 2 is a schematic diagram of incisions made in a prepreg.

FIG. 2 shows an example of an incised prepreg obtained by making incisions 5 in a unidirectional prepreg. In the present invention, in cases where the unidirectional prepreg contained in the prepreg laminate is composed only of continuous reinforcing fibers, that is, in cases where the unidirectional prepreg does not contain discontinuous reinforcing fibers, such as cases where no incision for cutting the reinforcing fibers is made, the continuous reinforcing fibers become tense in an uneven portion of the mold during the heating and pressurization of the prepreg laminate. It is therefore very difficult for the prepreg laminate to conform to a complicated shape in such cases. Because of this, the present invention uses the discontinuous fiber prepreg in order to give shape conformity to the prepreg laminate, and an incised prepreg having made incisions is preferably used. By changing the shape and/or the arrangement pattern of the incisions, improved shape conformity can be achieved. For example, in FIG. 2, as the length of each incision, X (which may be hereinafter referred to as incision length), increases, and, as the length of each discontinuous reinforcing fiber $R_2$ cut by the incisions, Y (which may be hereinafter referred to as fiber length), decreases, the incised prepreg can have higher shape conformity. Thus, the prepreg laminate of the present invention preferably contains an incised prepreg which satisfies $y<6x+10$ in cases where priority is given to shape conformity rather than mechanical properties.

In the present invention, the average length of the incisions, x, is ideally the average of the lengths of all the incisions made in the incised prepreg. However, practically, since measurement of the lengths of all the incisions is not realistic, measurement is carried out using an image of the incised prepreg taken by a photographing apparatus such as a digital microscope, and the average calculated from the measured values is provided as the average length of the incisions. The incision pattern can be extracted by taking a photograph of the incised prepreg at an arbitrary position, and then linking the ends of the incisions to each other in the obtained image through segments. For example, a pattern regarding, for example, at what angles the incisions are made, whether the plurality of incisions are made in parallel to each other, and whether the incisions are made at equal intervals is extracted by linking the ends of each incision to each other through a segment. The length of the segment is defined as the length of the incision, and the lengths of a total of 10 incisions are measured. The average of the lengths is defined as the average length of the incisions. Each incision may have either a linear shape or a curved shape. In cases where the incision has a curved shape, the length of the segment linking the ends of the incision to each other is defined as the length of the incision X.

The average length of the discontinuous reinforcing fibers $R_2$ cut by the incisions in the present invention, y, is determined similarly to the average length of the incisions. Measurement is carried out using an image taken by a photographing apparatus such as a digital microscope, and the average calculated from the measured values is defined as the average length of the discontinuous reinforcing fibers $R_2$ cut by the incisions. In the image, two incisions adjacent to each other in parallel along the fiber direction of the reinforcing fibers are selected, and the ends of each incision are linked to each other through a segment to extract the incision pattern. The distance between the two adjacent incisions along the direction parallel to the fiber direction of the reinforcing fibers is defined as the length of reinforcing fibers. The length of reinforcing fibers is measured for a total of 10 distances between segments, and the resulting average is defined as the average length of the reinforcing fibers cut by the incisions, y.

In another mode, the prepreg laminate of the present invention contains an incised prepreg in which the average length of the incisions, x, and the average length of the discontinuous reinforcing fibers $R_2$ cut by the incisions, y, satisfy $y \geq 6x+10$.

Since the discontinuous reinforcing fibers $R_2$ contained in the incised prepreg have nonrandom orientation angles, and are obtained from a prepreg containing unidirectionally oriented reinforcing fibers, a fiber-reinforced plastic having excellent mechanical properties can be produced without causing orientation nonuniformity or distribution nonuniformity of the reinforcing fibers. Mechanical properties of the incised prepreg can be improved by changing the incision shape, the arrangement pattern, and/or the like. For example, as the incision length X decreases, and, as the length of the discontinuous reinforcing fiber $R_2$ cut by the incisions, Y, increases, knockdown from the mechanical properties of the original, unincised prepreg can be reduced, and better mechanical properties can be realized. Accordingly, the prepreg laminate of the present invention preferably contains an incised prepreg which satisfies $y \geq 6x+10$ in cases where priority is given to mechanical properties rather than shape conformity.

In another preferred mode of the prepreg laminate of the present invention, the surface area of each laminate plane of the discontinuous fiber prepreg contained in the prepreg laminate may be not less than 80% and less than 100% with respect to 100% of the surface area of the outer surface of the woven fabric prepreg arranged on at least one surface layer. The outer surface of the woven fabric prepreg may include uneven portions on the plane in the lamination direction, but does not include the side of the woven fabric prepreg. In cases where the woven fabric prepreg is arranged on both lamination planes of the prepreg laminate, the woven fabric prepreg on the plane having a larger surface area may be selected for the confirmation of whether the relationship with the discontinuous fiber prepreg is as described above. However, the woven fabric prepreg on each of both surface layers may have the above relationship with the discontinuous fiber prepreg. The discontinuous reinforcing fibers $R_2$ contained in the discontinuous fiber prepreg have short fiber lengths, and exhibit shape conformity during heating and pressurization. Therefore, in cases where the surface area of the discontinuous fiber prepreg is not less than 80% and less than 100% with respect to 100% of the surface area of the woven fabric prepreg, the discontinuous fiber prepreg can be allowed to extend or flow during heating and pressurization, thereby allowing the discontinuous fiber prepreg to conform to a mold having a complicated shape, so that occurrence of portions not filled with the base material in the mold cavity can be effectively prevented.

More specifically, in cases where a prepreg laminate as a preform for obtaining a fiber-reinforced plastic is obtained by forming the woven fabric prepreg and the discontinuous fiber prepreg with a mold, the woven fabric prepreg is carefully placed along uneven portions of the mold since it is less likely to extend, while the discontinuous fiber prepreg does not need to be carefully placed along uneven portions of the mold at the time when the preform is to be obtained since it can be placed along uneven portions of the mold by heating and pressurization. Thus, the prepreg laminate itself has a smaller surface area than the woven fabric prepreg. In cases where the woven fabric prepreg is placed along uneven portions of the mold, and then the discontinuous fiber prepreg is placed thereon, the woven fabric prepreg and the discontinuous fiber prepreg have a form in which they contact each other only in the vicinities of protruding portions of the mold, and in which they do not contact each other in the vicinities of recessed portions. Thus, the woven fabric prepreg and the discontinuous fiber prepreg constituting the prepreg laminate do not necessarily need to adhere to each other on the entire lamination plane, and may contain a portion where the prepregs do not contact each other depending on the shape of the mold. More preferably, the surface area of the discontinuous fiber prepreg is 80% to 95% with respect to 100% of the surface area of the woven fabric prepreg on one or both of the surfaces.

The present invention also provides a method of producing a fiber-reinforced plastic, the method comprising: an arrangement step of arranging the prepreg laminate in a mold for molding; a preheating step of preheating the prepreg laminate; and a molding step of heating and pressurizing the prepreg laminate to prepare a fiber-reinforced plastic.

Figure 3:
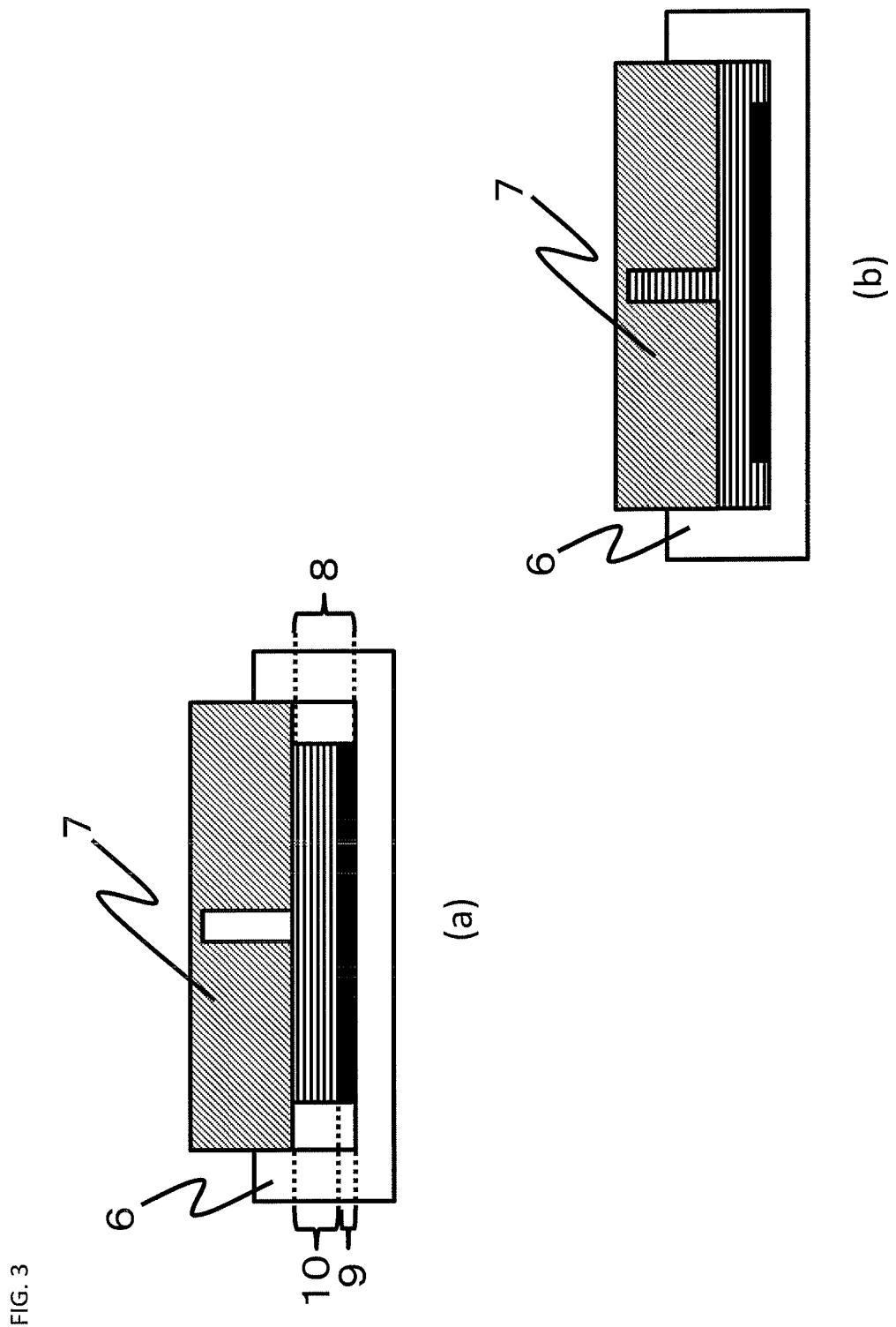
FIG. 3 is an example of the arrangement step in the method of producing a fiber-reinforced plastic.

The shape of the mold is not limited. A mold comprising a lower mold 6 and an upper mold 7 is commonly used. FIG. 3 is a schematic diagram illustrating one example of the steps of the method of producing a fiber-reinforced plastic. The arrangement step in the present invention means a step in which a prepreg laminate 8 produced outside the mold is arranged on the lower mold 6 as shown in FIG. 3(*a*), or a step in which a woven fabric prepreg 9 and a discontinuous fiber prepreg 10 are laminated on the lower mold 6 to prepare a prepreg laminate 8. In the arrangement step, the prepreg laminate may be arranged such that the surface where the woven fabric prepreg 9 is arranged is in contact with the surface of the lower mold 6 as shown in FIG. 3(*a*), or such that the surface where the discontinuous fiber prepreg 10 is arranged is in contact with the surface of the lower mold 6. The former case is preferred since the woven fabric prepreg can be preferentially heated. In cases where the entire prepreg laminate is to be uniformly heated, the prepreg laminate 8 may be arranged on the lower mold 6, and then the upper mold 7 may be arranged on the prepreg laminate 8 while care is taken not to apply a high pressure to the prepreg laminate 8.

The preheating step in the present invention is a step of heating a prepreg laminate arranged on a mold, before application of a pressure thereto (the heating before application of a pressure to the prepreg laminate is hereinafter referred to as preheating). In the present invention, by the preheating step, curing of the thermosetting resin A contained in the woven fabric prepreg can be allowed to proceed before curing of the thermosetting resin B contained in the discontinuous fiber prepreg. By this, disorder of the woven structure of the woven fabric prepreg can be suppressed at the time when the later-mentioned molding step is carried out. Regarding the method of preheating the prepreg laminate, the prepreg laminate 8 may be arranged on the mold in the arrangement step followed by increasing the temperatures of the upper and lower molds to perform the preheating, or the prepreg laminate 8 may be arranged on a lower mold 6 whose surface is preheated, to perform the preheating. From the viewpoint of increasing productivity, the latter case is especially preferred since the preheating step can be started immediately after the arrangement step. The temperature of the mold for carrying out the preheating step is not limited. In cases where the temperature is not less than 100° C., the effect based on the difference between Ta and Tb can be remarkably exhibited, which is preferred. In cases where the temperature is 110° C. to 180° C., curing of the resin proceeds more quickly, resulting in a shorter molding time, which is preferred. The time spent for the preheating of the prepreg laminate is preferably 5 seconds to 300 seconds. In cases where the preheating time is within the preferred range, curing of the thermosetting resin A can be sufficiently allowed to proceed in a controlled manner. The preheating time is more preferably 10 seconds to 180 seconds.

The molding step in the present invention is a step of heating and pressurizing the prepreg laminate, preheated in the preheating step, using upper and lower molds as shown in FIG. 3(*b*), to prepare a fiber-reinforced plastic. By the heating and pressurization of the prepreg laminate after the preheating step, the discontinuous fiber prepreg having high shape conformity is allowed to flow while deformation of the woven fabric prepreg is suppressed, resulting in filling of the mold cavity with the discontinuous fiber prepreg. Even in cases where the side and the vicinity of the woven fabric prepreg are filled with the discontinuous fiber prepreg due to the flow, movement of the fiber bundles constituting the woven fabric prepreg is suppressed to prevent disorder of the woven structure in the present invention. The means of the heating and pressurization may be carried out by, for example, press molding using a pressing machine.

Further, in another mode of the method of producing a fiber-reinforced plastic of the present invention, in cases where one of the surfaces of the prepreg laminate is formed by a surface of the discontinuous fiber prepreg, for example, in cases where, when one outer surface of the prepreg laminate is defined as surface $S_1$, a surface of the woven fabric prepreg forms the surface $S_1$, and, at the same time, when the other outer surface of the prepreg laminate is defined as surface $S_2$, a surface of the discontinuous fiber prepreg forms the surface $S_2$, the surface area of the mold in contact with the surface $S_2$ is preferably more than 100% and less than 200% with respect to 100% of the surface area of the surface $S_2$. The surface area of the mold herein means, in the mold in contact with the surface $S_2$ of the prepreg laminate immediately before carrying out the heating and pressurization in the molding step, the area of the surface that can be in contact with the flown base material under the assumption that the mold is completely filled with the base material after closing the mold. By setting the surface area of the mold to more than 100% and less than 200% with respect to 100% of the surface area of surface $S_2$ of the prepreg laminate, the discontinuous fiber prepreg can be allowed to flow to achieve sufficient filling of the mold cavity in the molding step, thereby enabling production of a fiber-reinforced plastic having a complicated shape. The surface area of the mold is more preferably 110% to 150%.

A fiber-reinforced plastic obtained by the production method according to the present invention has a surface appearance of a woven structure derived from the woven fabric prepreg, and contains reinforcing fibers having short fiber lengths derived from the discontinuous fiber prepreg. More specifically, when a layer $L_1$ and plural layers $L_2$ are contained in the fiber-reinforced plastic and form a laminate structure, with the assumption that the layer $L_1$ is present on at least one surface of the fiber-reinforced plastic and contains reinforcing fibers whose reinforced form has a woven structure, and a resin, and that the layers $L_2$ contain discontinuous reinforcing fibers and a resin, the layer $L_1$ in the fiber-reinforced plastic has a fiber flow ratio of 1.0 to 5.0.

In the above description, the layer $L_1$ corresponds to a layer formed by curing of the woven fabric prepreg in the prepreg laminate. For the purposes of giving a geometric design and improving the surface quality, a surface of the fiber-reinforced plastic is preferably provided with a layer $L_1$ in which reinforcing fibers have a woven structure. The form of the woven structure of the reinforcing fibers contained in the layer $L_1$ is not limited, and examples thereof that may be used include unidirectional woven fabrics in which plural fiber bundles unidirectionally aligned such that they are parallel to each other, and auxiliary fibers perpendicular thereto, are grossed with each other to form a woven structure, biaxial fabrics in which plural fiber bundles are woven in two directions, and multi-axis fabrics in which fiber bundles aligned parallel to each other are laminated to form plural stages such that the stages have different fiber directions, followed by joining them together by stitching or the like. In particular, biaxial fabrics composed of fiber bundles perpendicular to each other are preferred because of their excellent conformity to three-dimensional shapes. They may have a variety of woven shapes such as plain weave, twill weave, long shaft weave, leno weave, mock leno weave, and twill weave. The fiber bundles constituting the woven fabric may have a uniform width among all the fiber bundles, or the width may vary among the fiber bundles. The layer $L_2$ corresponds to a layer formed by curing of the discontinuous fiber prepreg in the prepreg laminate. For conformity to complicated shapes, the reinforcing fibers contained in the layer $L_2$ have a length of preferably 1 to 100 mm, more preferably 10 to 50 mm.

The reinforcing fibers contained in the layer $L_1$ and the layer $L_2$ are not limited, and examples thereof include glass fibers, kevlar fibers, carbon fibers, graphite fibers, boron fibers, and aramid fibers. Among these reinforcing fibers, carbon fibers are especially preferred since they are light and have particularly excellent properties in the specific strength and the specific modulus. The resin contained in the layer $L_1$ is not limited as long as it is a cured thermosetting resin, and examples thereof include, but are not limited to, unsaturated polyester resins, vinyl ester resins, epoxy resins, benzoxazine resins, phenol resins, thiourea resins, melamine resins, and polyimide resins. The resin may also contain a filler or the like for the purpose of improving heat resistance and mechanical properties.

The resin contained in the layer $L_2$ is not limited as long as it is a cured thermosetting resin, and examples thereof include, but are not limited to, unsaturated polyester resins, vinyl ester resins, epoxy resins, benzoxazine resins, phenol resins, thiourea resins, melamine resins, and polyimide resins. The resin may also contain a filler or the like for the purpose of improving heat resistance and mechanical properties.

The fiber flow ratio in the present invention means the value defined as $h_{max}/h_{min}$, wherein h represents the fiber bundle width of the reinforcing fibers having a woven structure in the layer $L_1$; $h_{max}$ represents the maximum value of h contained in the fiber-reinforced plastic; and $h_{min}$ represents the minimum value of h. The fiber bundle width h herein means the distance between the two fibers at the outermost positions among the fibers constituting the fiber bundle.

Figure 4:
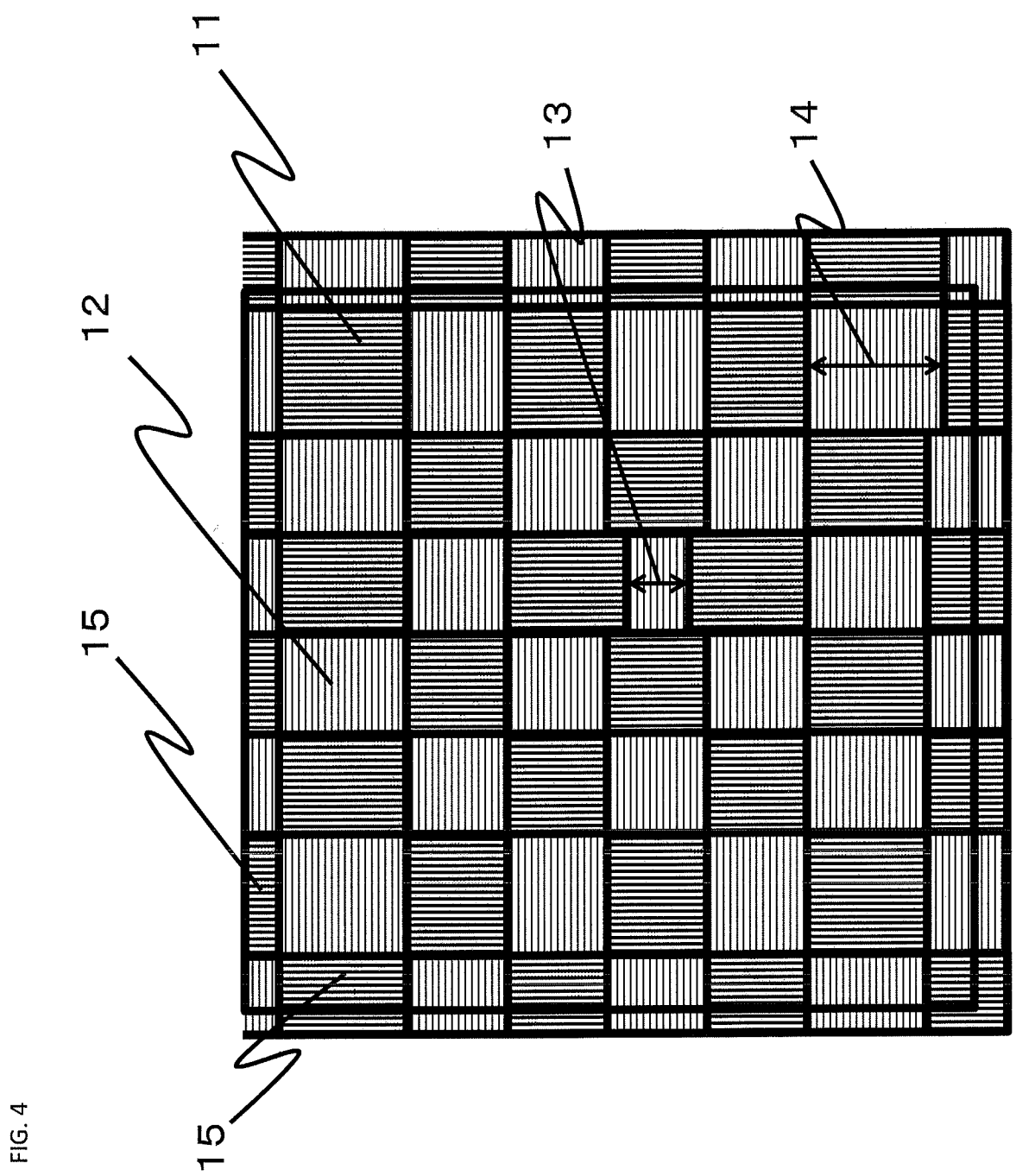
FIG. 4 is a schematic diagram of a surface where a woven fabric prepreg is arranged in a fiber-reinforced plastic.

FIG. 4 schematically shows an example of the external appearance of the layer $L_1$ in the fiber-reinforced plastic. Although plain weave is shown as the example, examples of the woven shape are not limited to plain weave, and include a variety of woven shapes. The woven structure is formed by warps 11 and wefts 12. The fiber bundle width at position 13, where the fiber bundle width is smallest, corresponds to $h_{min}$, and the fiber bundle width at position 14, where the fiber bundle width is largest, corresponds to $h_{max}$. The fiber bundles corresponding to the ends of the reinforcing fibers forming the layer $L_1$ (for example, fiber bundle 15) are excluded from the evaluation of the fiber flow ratio since they may lack part of the fiber bundles.

The fiber bundle width is visually measured using a ruler, vernier caliper, or the like. A method in which an image of the surface of the layer $L_1$ is obtained using a digital scope, followed by measurement using image processing software is also acceptable.

In cases where the fiber flow ratio of the fiber-reinforced plastic exceeds 5.0, it is suggested that the fiber bundles constituting the woven structure have high degree of disorder of the woven structure, and the surface quality is poor. A preferred upper limit of the fiber flow ratio is 2.5.

In a preferred mode of the fiber-reinforced plastic of the present invention, the dispersion parameter measured for each layer $L_2$ in a cross-section obtained by cutting the laminate structure in the lamination direction is not more than 10%.

The dispersion parameter herein means the value obtained as follows. From the layer $L_2$ found in a cross-section in the direction crossing the lamination direction of the fiber-reinforced plastic, 100 cross-sections of reinforcing fibers are randomly extracted, and their cross-sectional shapes are subjected to elliptical approximation. The standard deviation/the average of the major axes of the 100 resulting cross-sections is the dispersion parameter. The direction crossing the lamination direction is not limited, and may have an arbitrary angle as long as it is a direction crossing the cross-section. As long as at least one cross-section satisfying the above dispersion parameter range is found to be present by observation of an arbitrary cross-section crossing the lamination direction, the dispersion parameter is judged as satisfying the requirement. In cases where reinforcing fibers are unidirectionally oriented in the layer $L_2$ of the fiber-reinforced plastic, the reinforcing fibers have the same cross-sectional shape. For example, in a cross-section which is nearly perpendicular to the fiber direction, the cross-sectional shape of each reinforcing fiber becomes an ellipse close to a true circle. In a cross-section which is oblique to the fiber direction, the cross-sectional shape of each reinforcing fiber becomes an ellipse showing a large difference between the major axis and the minor axis. In the present invention, when a visible layer $L_2$ is present in the lamination direction in a cross-section crossing the lamination direction of the fiber-reinforced plastic, and, at the same time, the dispersion parameter is not more than 10% in this layer, the reinforcing fibers are suggested to be unidirectionally orientated in the layer $L_2$. In cases where the fibers contained in each layer $L_2$ of the fiber-reinforced plastic are unidirectionally oriented, distribution nonuniformity and orientation nonuniformity are suppressed, and the fiber-reinforced plastic exhibits good mechanical properties, which is preferred.

The dispersion parameter is measured as follows. From a cross-section of the fiber-reinforced plastic obtained as described above, an image is obtained using a digital scope or the like, and 100 cross-sections of reinforcing fibers are randomly selected from the image of the cross-section. The cross-sectional shapes of the selected reinforcing fibers are regarded as ellipses, and their major axes are measured. The standard deviation/the average of the major axes is calculated as the dispersion parameter. The major axis of the cross-sectional shape of a reinforcing fiber, when the shape is regarded as an ellipse, is defined as the maximum value of the length of the line connecting two arbitrary points on the circumference of the cross-section of the reinforcing fiber obtained.

In a more preferred mode of the present invention, the fiber-reinforced plastic has plural layers $L_2$, and there is a cross-section satisfying the following: when, from one layer $L_2$ found in a cross-section obtained by cutting at an arbitrary position crossing the lamination direction, 100 cross-sections of reinforcing fibers are randomly extracted followed by subjecting these fiber cross-sectional shapes to elliptical approximation and calculating the average of the major axes of the 100 extracted cross-sections, $D_1$, and, from another layer $L_2$ in the same cross-section as the cross-section described above, 100 cross-sections of reinforcing fibers are randomly extracted followed by subjecting these fiber cross-sectional shapes to elliptical approximation and calculating the average of the major axes of the 100 extracted cross-sections, $D_2$, $D_1$ is not less than two times larger than $D_2$. The direction crossing the lamination direction is not limited, and may have an arbitrary angle as long as it is a direction crossing the cross-section.

The term "$D_1$ is not less than two times larger than $D_2$" means that, among the plurality of layers $L_2$ constituting the fiber-reinforced plastic, there is a combination showing different orientation directions of the reinforcing fibers contained in each layer $L_2$. In cases where the reinforcing fibers are oriented in plural directions in the fiber-reinforced plastic, the fiber-reinforced plastic has isotropic mechanical properties, which is preferred. When three or more layers $L_2$ are present, the average of the major axes of fiber cross-sections in one of the layers does not need to be not less than two times larger than the average of the major axes in some other layers, as long as the average of the major axes in the one layer is not less than two times larger than that of any of the layers other than those layers.

In a more preferred mode of the present invention, the fiber-reinforced plastic has plural layers $L_2$, and the average of the lengths of the reinforcing fibers contained in one layer $L_2$ is preferably smaller than the average of the lengths of the reinforcing fibers contained in another layer $L_2$.

The mechanical properties of the fiber-reinforced plastic depend on the lengths of the reinforcing fibers contained in the fiber-reinforced plastic. Basically, as the lengths of the reinforcing fibers contained in the fiber-reinforced plastic increase, the mechanical properties are improved. As the lengths of the reinforcing fibers decrease, shape conformity during molding is improved. Thus, the lengths of the reinforcing fibers contained in the fiber-reinforced plastic are selected in accordance with the mechanical properties and the shape demanded. In cases where the fiber-reinforced plastic contains layers $L_2$ having different fiber lengths, fiber-reinforced plastics having desired mechanical properties and a desired shape can be obtained, which is preferred. When three or more layers $L_2$ are present, the average of the lengths of the reinforcing fibers in one of the layers may be the same as the average of the lengths of the reinforcing fibers in some other layers, as long as the average of the lengths of the reinforcing fibers in the one layer is different from that in any of the layers other than those layers. For confirmation of the fact that the fiber-reinforced plastic has plural layers $L_2$, and that the average of the lengths of the reinforcing fibers contained in one layer $L_2$ is smaller than the average of the lengths of the reinforcing fibers contained in another layer $L_2$, a method in which the fiber lengths of reinforcing fibers are measured after burning off the resin in the fiber-reinforced plastic is used. More specifically, the resin in the fiber-reinforced plastic obtained is burned off (at a burning-off temperature of 500° C. in cases of an epoxy resin) to obtain a fiber mat composed of reinforcing fibers. The average of the fiber lengths of the reinforcing fibers contained in the fiber-reinforced plastic is defined as the average for 10 reinforcing fibers arbitrarily extracted from the fiber mat surface. After the measurement of the average of the lengths of the reinforcing fibers, fibers of the fiber mat are uniformly peeled off from the surface. At the time point when the fiber length largely changed, 10 reinforcing fibers are extracted from the surface of the fiber mat at this time point, and the average of the lengths of the reinforcing fibers is calculated again. The calculated average of the lengths of the reinforcing fibers is compared with the average for the reinforcing fibers that was calculated first. In cases where these lengths are different from each other by not less than 1 mm, the average of the lengths of the reinforcing fibers contained in one layer $L_2$ is judged to be smaller than the average of the lengths of the reinforcing fibers contained in another layer $L_2$ in the fiber-reinforced plastic.

EXAMPLES

The present invention is described below more concretely by way of Examples. However, the present invention is not limited to the inventions described in the Examples.

The methods of preparing the prepregs used in Examples are described below.

<Epoxy Resin Compositions>

Using the following raw materials, epoxy resin compositions $C_1$ to $C_5$ were prepared. The resin compositions of the epoxy resin compositions $C_1$ to $C_5$ are summarized in Table 1.

The epoxy resin compositions used in the present invention have the following components.

Epoxy Resins

"jER (registered trademark)" 828 (bisphenol A type epoxy resin, manufactured by Mitsubishi Chemical Corporation).

"jER (registered trademark)" 1007FS (bisphenol A type epoxy resin, manufactured by Mitsubishi Chemical Corporation).

"EPICLON (registered trademark)" N740 (phenol novolac type epoxy resin, manufactured by DIC Corporation).

"SUMI-EPDXY (registered trademark)" ELM 434 (di-amino diphenyl methane type epoxy resin, Sumitomo Chemical Co., Ltd.).

"Araldite (registered trademark)" MY 0600 (aminophenol-type epoxy resin, manufactured by Huntsman Advanced Materials).

Hardener

DICY7 (dicyandiamide, manufactured by Mitsubishi Chemical Corporation).

Curing Accelerators

"Omicure (registered trademark)" (toluene bis (dimethylurea), manufactured by PTI Japan Ltd.).

DCMU-99 (3-(3,4-dichlorophenyl)-1,1-dimethylurea, manufactured by Hodogaya Chemical Co., Ltd.).

Thermoplastic Resins

"VINYLEC (registered trademark)" K (polyvinyl formal, manufactured by INC Corporation).

"SUMIKAEXCEL (registered trademark)" PES 5003P (polyethersulfone, manufactured by Sumitomo Chemical Co., Ltd.).

<Method of Preparing Epoxy Resin Compositions>

As base resins of each epoxy resin composition, each epoxy resin and each thermoplastic resin described above were fed into a beaker, and the resulting mixture was heated to a temperature of 150° C., followed by heating and kneading of the mixture for 30 minutes. After decreasing the temperature to 60° C., the hardener and each curing accelerator were fed thereto, and kneading was carried out for 10 minutes to obtain the epoxy resin composition.

<Carbon Fibers>

"TORAYCA (registered trademark)" T300 (manufactured by Toray Industries, Inc.), "TORAYCA (registered trademark)" T700S (manufactured by Toray Industries, Inc.), and "TORAYCA (registered trademark)" T1100G (manufactured by Toray Industries, Inc.).

<Method of Preparing Prepregs>

Each epoxy resin composition obtained according to the above method of preparing an epoxy resin composition was applied to release paper using a reverse roll coater, to prepare two resin films. Subsequently, on "TORAYCA (registered trademark)", which is described above as carbon fibers, aligned in a sheet shape, the two resin films obtained were layered from both sides of the carbon fibers. This was followed by pressurization and heating at a temperature of 110° C. under a pressure of 2 MPa to allow impregnation with the epoxy resin composition, to obtain prepregs $P_1$ to $P_7$. The combinations of the epoxy resin composition and the carbon fibers used for the prepregs prepared according to the above method of preparing a prepreg are summarized in Table 2.

Prepreg $P_1$, prepreg $P_5$, prepreg $P_6$, and prepreg $P_7$ are woven fabric prepregs in which reinforcing fibers have a woven structure. In the present Examples, incised prepregs were used as the discontinuous fiber prepregs. Prepregs $P_2$, $P_3$, and $P_4$ are prepregs in which reinforcing fibers are unidirectionally oriented. Incisions for cutting reinforcing fibers were made in prepregs $P_2$, $P_3$, and $P_4$, to prepare incised prepregs. Using each of the above prepregs, moldability evaluation $E_1$, moldability evaluation $E_2$, and moldability evaluation $E_3$ were carried out as described below. The results obtained are summarized in Table 3, Table 4, and Table 5.

<Measurement of Ta and Tb>

The heat flow curve 1 in the present invention was obtained using a differential scanning calorimeter (DSC) as follows. About 10 mg of epoxy resin composition $C_1$ to $C_5$ was included in an aluminum sample pan, and the sample pan was placed on the sample stage in the cell. As a reference, an empty aluminum sample pan was placed on the reference stage. Analysis was then carried out by heating each sample from 50° C. to 130° C. at 700° C./min under a nitrogen atmosphere followed by retention at 130° C. until completion of thermal curing reaction. From the heat flow curve 1 obtained, the gross calorific value of each of the epoxy resin compositions $C_1$ to $C_5$ was calculated according to the trapezoidal rule of sectional measurement, and the time required for the calorific value of the epoxy resin composition to reach 50% of the gross calorific value was calculated. The times required for the calorific values of the epoxy resin compositions $C_1$ to $C_5$ to reach 50% of their gross calorific values are represented as $T_{C1}$ to $T_{C5}$, respectively. The results of the analysis were as follows: $T_{C1}$=215.1 seconds, $T_{C2}$=374.4 seconds, $T_{C3}$=361.7 seconds, $T_{C4}$=171.0 seconds, and $T_{C5}$=168.7 seconds.

<Moldability Evaluation $E_1$>

Figure 5:
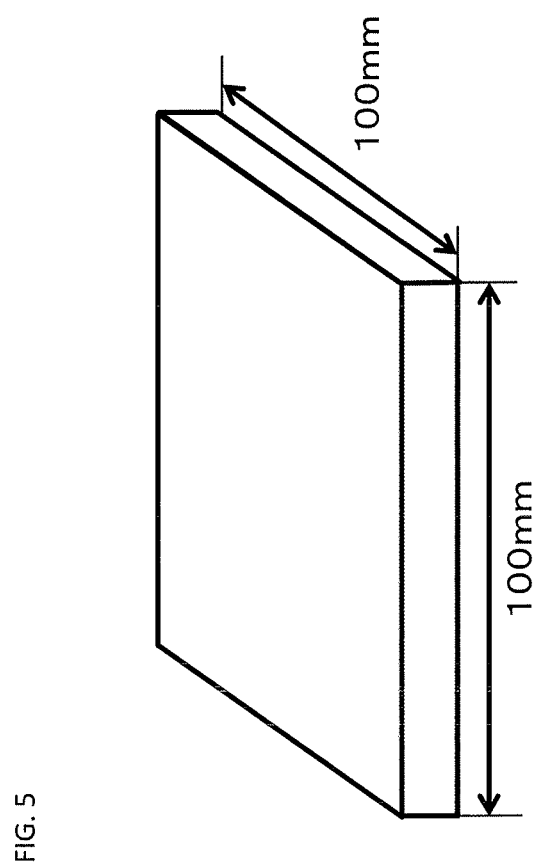
FIG. 5 is an example of an embodiment in the present invention.

In moldability evaluation $E_1$, the planar fiber-reinforced plastic shown in FIG. 5 was produced. First, each prepreg was cut into an arbitrary size, and laminated to prepare a prepreg laminate. In this process, the lamination was carried out such that a woven fabric prepreg was arranged only on one surface of the prepreg laminate. Thereafter, the prepreg laminate was arranged on a lower mold whose mold surface shape is a square of 100 mm×100 mm, having a mold cavity with a depth of 10 mm, such that the surface having the woven fabric prepreg arranged thereon was in contact with the surface of the lower mold. For this process, the lower mold had been preliminarily heated to a predetermined temperature. Thereafter, an upper mold heated to the same temperature as the lower mold was arranged on the prepreg laminate. Thereafter, the temperature was maintained for a predetermined length of time to preheat the prepreg laminate. After the predetermined length of time has passed, heating and pressurization were carried out using a pressing machine to produce a planar fiber-reinforced plastic. The filling condition of the resulting fiber-reinforced plastic in the mold was observed, and the fiber flow ratio of the fiber-reinforced plastic surface was calculated. The results were rated on the following 3-point scale (good/fair/poor).

Good: The mold was filled with the base material, and the fiber flow ratio was not less than 1.0 and less than 2.5.

Fair: The mold was filled with the base material, and the fiber flow ratio was not less than 2.5.

Poor: The mold was not filled with the base material.

<Moldability Evaluation $E_2$>

Figure 6:
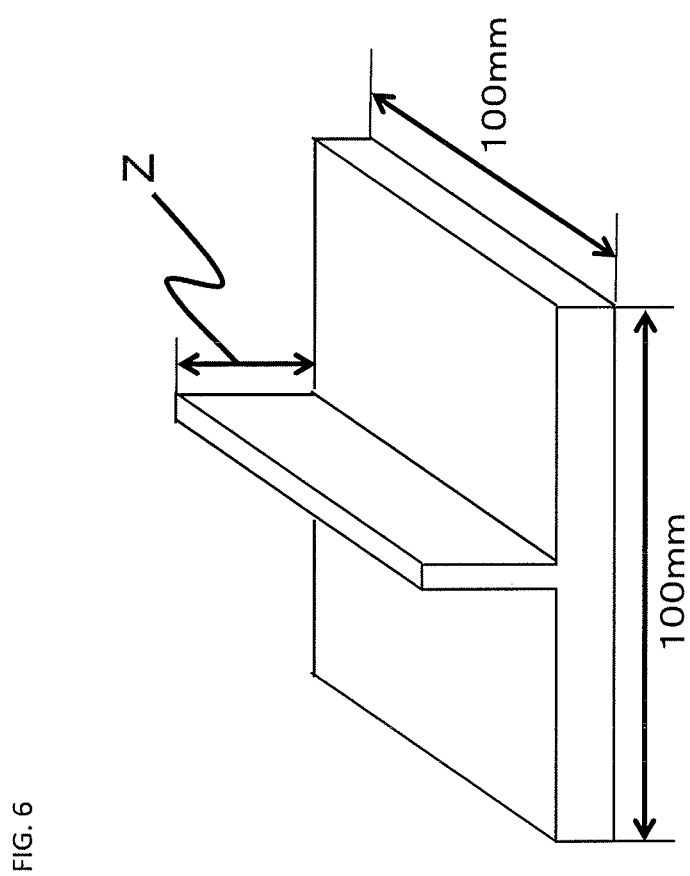
FIG. 6 is an example of an embodiment in the present invention.

In moldability evaluation $E_2$, the fiber-reinforced plastic having a rib shown in FIG. 6 was produced. First, each prepreg was laminated to produce a prepreg laminate. In this process, the lamination was carried out such that a woven fabric prepreg was arranged only on one surface of the prepreg laminate. In the arrangement step, the prepreg laminate was arranged on a lower mold whose mold surface shape is a square of 100 mm×100 mm, having a mold cavity with a depth of 10 mm, such that the surface having the woven fabric prepreg arranged thereon was in contact with the surface of the lower mold. The lower mold had been preliminarily heated to a predetermined temperature. Thereafter, an upper mold heated to the same temperature as the lower mold was arranged on the prepreg laminate. Thereafter, the temperature was maintained for a predetermined length of time to preheat the prepreg laminate. After the predetermined length of time has passed, press molding was carried out using a pressing machine to obtain a fiber-reinforced plastic having a rib. For the resulting fiber-reinforced plastic, the rib height Z and the fiber flow ratio were calculated. The values were rated on the following 3-point scale (good/fair/poor). The rib height herein means the maximum value of the height of the rib formed on the fiber-reinforced plastic.

Good: The height of the standing rib was not less than 5 mm, and the fiber flow ratio was not less than 1.0 and less than 2.5.

Fair: The height of the standing rib was not less than 5 mm, and the fiber flow ratio was not less than 2.5.

Poor: The height of the standing rib was less than 5 mm.

<Moldability Evaluation $E_3$>

Figure 7:
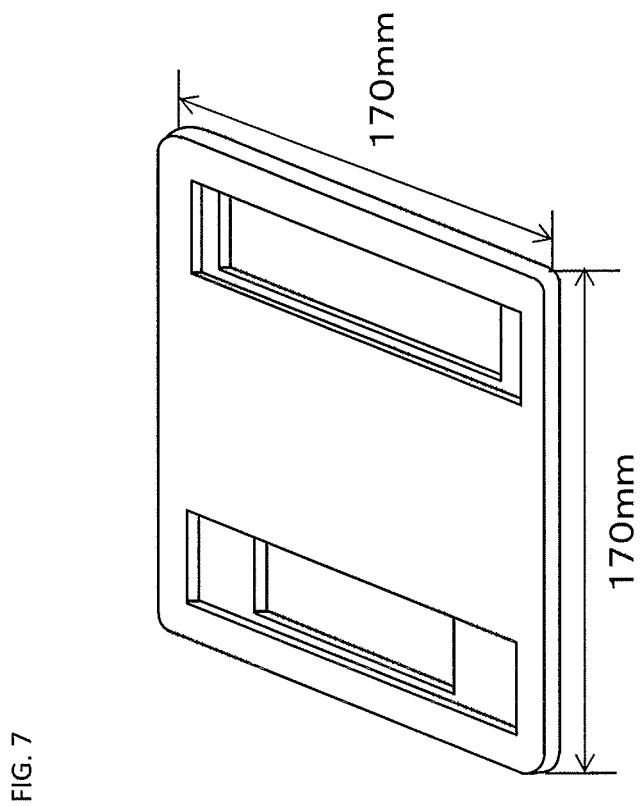
FIG. 7 is an example of an embodiment in the present invention.

In moldability evaluation $E_3$, a fiber-reinforced plastic having an uneven curve on the surface was produced as shown in FIG. 7. First, each prepreg was cut into an arbitrary size, and laminated to produce a prepreg laminate. In this process, the lamination was carried out such that a woven fabric prepreg was arranged only on one surface of the prepreg laminate. In the arrangement step, the prepreg laminate was arranged on a lower mold of 170 mm×170 mm having an uneven curve on the mold surface, such that the surface having the woven fabric prepreg was in contact with the surface of the lower mold. For this process, the lower mold had been preliminarily heated to a predetermined temperature. Thereafter, an upper mold heated to the same temperature as the lower mold was arranged on the prepreg laminate. Thereafter, the temperature was maintained for a predetermined length of time to preheat the prepreg laminate. After the predetermined length of time has passed, press molding was carried out using a pressing machine to obtain a fiber-reinforced plastic having unevenness on the surface. For the resulting fiber-reinforced plastic, the fiber flow ratio was calculated, and the value was rated on the following 3-point scale (good/fair/poor).

Good: The fiber flow ratio was not less than 1.0 and less than 2.5.
Fair: The fiber flow ratio was not less than 2.5.
Poor: Molding was impossible.

<Method of Measuring Fiber Flow Ratio>

The surface of the obtained fiber-reinforced plastic was visually observed, and $h_{min}$ and $h_{max}$ were measured using a ruler having a minimum scale of 1 mm. The fiber flow ratio was then calculated.

<Method of Observing Cross-Section of Fiber-Reinforced Plastic>

The obtained fiber-reinforced plastic was cut in the thickness direction (lamination direction) to prepare a sample whose layer structure is exposed. Thereafter, the cross-section of the sample was ground using a grinder. The sample whose cross-section was ground was observed under a digital scope, and the dispersion parameter of each layer $L_2$ found in the cross-section of the fiber-reinforced plastic was measured.

Example 1

Prepreg $P_6$ was cut into a square of 97 mm×97 mm to prepare the woven fabric prepreg in the present invention. Subsequently, prepreg $P_3$ was cut into a square of 85 mm×85 mm, and incisions were made such that the average length of the incisions was 1 mm, such that the angle of the incisions with respect to the orientation direction of the reinforcing fibers (incision angle) was 14°, and such that the average length of the discontinuous reinforcing fibers cut by the incisions became 25 mm, to prepare the incised prepreg in the present invention. The incised prepreg was laminated such that the laminate constitution became $[0°/90°]_{4S}$, and then the woven fabric prepreg was laminated on one surface of the laminate, to prepare a prepreg laminate. Subsequently, the obtained prepreg laminate was arranged on the lower mold for production of the fiber-reinforced plastic described for the moldability evaluation $E_1$, which lower mold had been preliminarily heated to 130° C. After the arrangement of the prepreg laminate, an upper mold heated to the same temperature as the lower mold was arranged thereon, followed by maintaining the temperature for 150 seconds to preheat the prepreg laminate. Thereafter, while the temperature of the upper and lower molds was maintained at 130° C., press molding was carried out at a contact pressure of 5 MPa using a pressing machine, to produce a fiber-reinforced plastic. Moldability evaluation $E_1$ was then carried out.

In this case, the thermosetting resin A in the present invention corresponds to the epoxy resin composition $C_4$, and the thermosetting resin B corresponds to the epoxy resin composition $C_1$. Thus, the calorific value condition was satisfied because Tb−Ta=44.1. All the relationships between the average length of the incisions made in the incised prepreg, x, and the average length of the discontinuous reinforcing fibers cut by the incisions, y, satisfied y≥6x+10. The ratio of the surface area of the incised prepreg to 100% of the surface area of the outermost surface, in the lamination direction, of the woven fabric prepreg (area ratio $AR_1$; the same applies hereinafter) was 77%. The surface area of the incised prepreg herein means the surface area of the incised prepreg in contact with the woven fabric prepreg. The surface area of the mold in contact with the side of the prepreg laminate where the incised prepreg was arranged, that is, in contact with the surface $S_2$ described above, was 138% in terms of the ratio to 100% of the surface area of the surface $S_2$ (area ratio $AR_2$; the same applies hereinafter).

According to the result of evaluation of the fiber-reinforced plastic obtained, the mold was completely filled with the base material, and the fiber flow ratio was 3.5. Each layer $L_2$ satisfied the dispersion parameter. Further, there was a combination of layers $L_2$ in which the average, $D_1$, of the major axes of cross-sections of reinforcing fibers in one layer $L_2$ was not less than two times larger than the average, $D_2$, of the major axes of cross-sections of reinforcing fibers in another layer $L_2$ found in the same cross-section of the laminate in the lamination direction.

Example 2

A prepreg laminate was produced in the same manner as in Example 1 except that prepreg $P_1$ was used instead of prepreg $P_6$, and that prepreg $P_2$ was used instead of prepreg $P_3$. Moldability evaluation $E_1$ was then carried out.

In this process, the calorific value condition was satisfied because Tb−Ta=159.3. All the relationships between the average length of the incisions made in the incised prepreg, x, and the average length of the discontinuous reinforcing fibers cut by the incisions, y, satisfied y≥6x+10. The area ratio ARA was 77%, and the area ratio $AR_2$ was 138%.

According to the result of evaluation of the fiber-reinforced plastic obtained, the mold was completely filled with the base material, and the fiber flow ratio was 1.8. Each layer $L_2$ satisfied the dispersion parameter. Further, there was a combination of layers $L_2$ in which the average, $D_1$, of the major axes of cross-sections of reinforcing fibers in one layer $L_2$ was not less than two times larger than the average, $D_2$, of the major axes of cross-sections of reinforcing fibers in another layer $L_2$ found in the same cross-section of the laminate in the lamination direction.

Example 3

A prepreg laminate was produced in the same manner as in Example 2 except that the average length of the incisions made in the incised prepreg was 1 mm, and that the fiber length of the discontinuous reinforcing fibers cut by the incisions was 12.5 mm. Moldability evaluation $E_1$ was then carried out.

In this process, the calorific value condition was satisfied because Tb−Ta=159.3. All the relationships between the average length of the incisions made in the incised prepreg, x, and the average length of the discontinuous reinforcing fibers cut by the incisions, y, satisfied y<6x+10. The area ratio $AR_1$ was 77%, and the area ratio $AR_2$ was 138%.

According to the result of evaluation of the fiber-reinforced plastic obtained, the mold was completely filled with the base material, and the fiber flow ratio was 2.1. Each layer $L_2$ satisfied the dispersion parameter. Further, there was a combination of layers $L_2$ in which the $D_1$ was not less than two times larger than the $D_2$.

Example 4

A prepreg laminate was produced in the same manner as in Example 2 except that the woven fabric prepreg was formed as a square having a size of 90 mm×90 mm. Moldability evaluation $E_1$ was then carried out.

In this process, the calorific value condition was satisfied because Tb−Ta=159.3. All the relationships between the average length of the incisions made in the incised prepreg, x, and the average length of the discontinuous reinforcing fibers cut by the incisions, y, satisfied y≥6x+10. The area ratio $AR_1$ was 89%, and the area ratio $AR_2$ was 138%.

According to the result of evaluation of the fiber-reinforced plastic obtained, the mold was completely filled with the base material, and the fiber flow ratio was 1.7. Each layer $L_2$ satisfied the dispersion parameter. Further, there was a combination of layers $L_2$ in which the $D_1$ was not less than two times larger than the $D_2$.

Example 5

The woven fabric prepreg was formed as a square having a size of 50 mm×50 mm. A prepreg laminate was produced in the same manner as in Example 2 except that prepreg $P_4$ was used instead of prepreg $P_2$, and that the size of the incised prepreg was 45 mm×45 mm. Moldability evaluation $E_1$ was then carried out.

In this process, the calorific value condition was satisfied because Tb−Ta=146.6. All the relationships between the average length of the incisions made in the incised prepreg, x, and the average length of the discontinuous reinforcing fibers cut by the incisions, y, satisfied y≥6x+10. The area ratio $AR_1$ was 81%, and the area ratio $AR_2$ was 493%.

According to the result of evaluation of the fiber-reinforced plastic obtained, the fiber flow ratio was 2.0. However, the mold was not completely filled with the base material, and the desired shape could not be obtained. Each layer $L_2$ satisfied the dispersion parameter. Further, there was a combination of layers $L_2$ in which the $D_1$ was not less than two times larger than the $D_2$.

Example 6

A prepreg laminate was produced in the same manner as in Example 2 except that the mold temperature was 140° C., and that the preheating time was 120 seconds, in the preheating step. Moldability evaluation $E_1$ was then carried out.

According to the result of evaluation of the fiber-reinforced plastic obtained, the mold was completely filled with the base material, and the fiber flow ratio was 1.9. Each layer $L_2$ satisfied the dispersion parameter. Further, there was a combination of layers $L_2$ in which the $D_1$ was not less than two times larger than the $D_2$.

Example 7

A prepreg laminate was produced in the same manner as in Example 2 except that the mold temperature was 120° C., and that the preheating time was 180 seconds, in the preheating step. Moldability evaluation $E_1$ was then carried out.

According to the result of evaluation of the fiber-reinforced plastic obtained, the mold was completely filled with the base material, and the fiber flow ratio was 1.3. Each layer $L_2$ satisfied the dispersion parameter. Further, there was a combination of layers $L_2$ in which the $D_1$ was not less than two times larger than the $D_2$.

Example 8

A prepreg laminate was produced in the same manner as in Example 2 except that the laminate constitution of the layers $L_2$ of the prepreg laminate was $[0°]_4$. Moldability evaluation $E_1$ was then carried out.

According to the result of evaluation of the fiber-reinforced plastic obtained, the mold was completely filled with the base material, and the fiber flow ratio was 1.5. Each layer $L_2$ satisfied the dispersion parameter.

Example 9

A prepreg laminate was produced in the same manner as in Example 2 except that the laminate constitution of the prepreg laminate was quasi-isotropic lamination $[45°/0°/−45°/90°]_{2S}$. Moldability evaluation $E_1$ was then carried out.

According to the result of evaluation of the fiber-reinforced plastic obtained, the mold was completely filled with the base material, and the fiber flow ratio was 1.3. Each layer $L_2$ satisfied the dispersion parameter. Further, there was a combination of layers $L_2$ in which the $D_1$ was not less than two times larger than the $D_2$.

Example 10

A prepreg laminate was produced in the same manner as in Example 9 except that prepreg $P_6$ was used instead of prepreg $P_1$, and that prepreg $P_3$ was used instead of prepreg $P_2$. Moldability evaluation $E_1$ was then carried out.

In this process, the calorific value condition was satisfied because Tb−Ta=44.1. All the relationships between the average length of the incisions made in the incised prepreg, x, and the average length of the discontinuous reinforcing fibers cut by the incisions, y, satisfied y<6x+10. The area ratio $AR_1$ was 77%, and the area ratio $AR_2$ was 138%.

According to the result of evaluation of the fiber-reinforced plastic obtained, the mold was completely filled with the base material, and the fiber flow ratio was 3.3. Each layer $L_2$ satisfied the dispersion parameter. Further, there was a combination of layers $L_2$ in which the $D_1$ was not less than two times larger than the $D_2$.

Example 11

A prepreg laminate was produced in the same manner as in Example 2 except that prepreg $P_7$ was used instead of prepreg $P_1$, and that prepreg $P_3$ was used instead of prepreg $P_2$. Moldability evaluation $E_1$ was then carried out.

In this process, the calorific value condition was satisfied because Tb−Ta=46.4. All the relationships between the average length of the incisions made in the incised prepreg, x, and the average length of the discontinuous reinforcing fibers cut by the incisions, y, satisfied y≥6x+10. The area ratio $AR_1$ was 77%, and the area ratio $AR_2$ was 138%.

According to the result of evaluation of the fiber-reinforced plastic obtained, the mold was completely filled with the base material, and the fiber flow ratio was 3.6. Each layer $L_2$ satisfied the dispersion parameter. Further, there was a combination of layers $L_2$ in which the $D_1$ was not less than two times larger than the $D_2$.

Example 12

A prepreg laminate was produced in the same manner as in Example 2 except that prepreg $P_5$ was used instead of prepreg $P_1$, and that prepreg $P_4$ was used instead of prepreg $P_2$. Moldability evaluation $E_1$ was then carried out.

In this process, the calorific value condition was satisfied because Tb−Ta=146.6. All the relationships between the average length of the incisions made in the incised prepreg, x, and the average length of the discontinuous reinforcing fibers cut by the incisions, y, satisfied y≥6x+10. The area ratio $AR_1$ was 77%, and the area ratio $AR_2$ was 138%.

According to the result of evaluation of the fiber-reinforced plastic obtained, the mold was completely filled with the base material, and the fiber flow ratio was 2.0. Each layer $L_2$ satisfied the dispersion parameter. Further, there was a combination of layers $L_2$ in which the $D_1$ was not less than two times larger than the $D_2$.

Example 13

Prepreg $P_1$ was cut into a square of 90 mm×90 mm, to prepare a woven fabric prepreg. Subsequently, prepreg $P_2$ was cut into a square of 85 mm×85 mm, and incisions were made such that the average length of the incisions was 1 mm, such that the incision angle of the incisions with respect to the orientation direction of the reinforcing fibers was 14°, and such that the average length of the cut discontinuous reinforcing fibers became 25 mm, to prepare an incised prepreg. The incised prepreg was laminated such that the laminate constitution became $[0°/90°]_{4S}$, and then the woven fabric prepreg was laminated on one surface of the laminate, to prepare a prepreg laminate. Subsequently, the obtained prepreg laminate was arranged on the lower mold for production of the fiber-reinforced plastic described for the moldability evaluation $E_2$, which lower mold had been preliminarily heated to 130° C. After the arrangement of the prepreg laminate, an upper mold heated to the same temperature as the lower mold was arranged thereon, followed by maintaining the temperature for 150 seconds to preheat the prepreg laminate. Thereafter, while the temperature of the upper and lower molds was maintained at 130° C., press molding was carried out at a contact pressure of 5 MPa using a pressing machine. Moldability evaluation $E_2$ was then carried out.

In this process, the calorific value condition was satisfied because Tb−Ta=159.3. All the relationships between the average length of the incisions made in the incised prepreg, x, and the average length of the discontinuous reinforcing fibers cut by the incisions, y, satisfied y≥6x+10. The area ratio $AR_1$ was 89%, and the area ratio $AR_2$ was 193%.

According to the result of evaluation of the fiber-reinforced plastic obtained, the fiber flow ratio was 1.8. A rib standing at a height of 7 mm was formed. Each layer $L_2$ satisfied the dispersion parameter. Further, there was a combination of layers $L_2$ in which the $D_1$ was not less than two times larger than the $D_2$.

Example 14

A prepreg laminate was produced in the same manner as in Example 9 except that, when the incised prepreg was laminated into a laminate constitution of $[45°/0°/−45°/90°]_{2S}$, an incised prepreg whose discontinuous reinforcing fibers have a fiber length of 25 mm was used as the incised prepreg for lamination of the eight layers as counted from the surface in the side where the woven fabric prepreg was arranged, and that an incised prepreg having a fiber length of 12.5 mm was used for lamination of the remaining eight layers, to obtain the prepreg laminate used. Moldability evaluation $E_2$ was then carried out.

According to the result of evaluation, the fiber-reinforced plastic had a rib of 13 mm. The fiber flow ratio was 1.7, and the surface quality was good. Each layer $L_2$ found in a cross-section of the fiber-reinforced plastic satisfied the dispersion parameter. Further, there was a combination of layers $L_2$ in which the $D_1$ was not less than two times larger than the $D_2$.

Example 15

Prepreg $P_1$ was cut into a square of 180 mm×180 mm, to prepare a woven fabric prepreg. Subsequently, prepreg $P_2$ was cut into a square of 170 mm×170 mm, and incisions were made such that the incision length was 1 mm, such that the incision angle of the incisions with respect to the orientation direction of the reinforcing fibers was 14°, and such that the fiber length became 25 mm, to prepare the incised prepreg. The incised prepreg was laminated such that the laminate constitution became $[0°/90°]_{4S}$, and then the woven fabric prepreg was laminated on one surface of the laminate, to prepare a prepreg laminate. The obtained prepreg laminate was arranged on a lower mold preliminarily heated to 130° C. After the arrangement of the prepreg laminate, an upper mold was attached thereto, followed by maintaining the temperature for 150 seconds for preheating. Thereafter, while the temperature of the molds was maintained at 130° C., pressurization using a pressing machine was carried out at a contact pressure of 5 MPa. Moldability evaluation $E_3$ was then carried out.

In this process, the calorific value condition was satisfied because Tb−Ta=159.3. All the relationships between the average length of the incisions made in the incised prepreg, x, and the average length of the discontinuous reinforcing fibers cut by the incisions, y, satisfied y≥6x+10. The area ratio $AR_1$ was 89%, and the area ratio $AR_2$ was 173%.

According to the result of evaluation of the fiber-reinforced plastic obtained, the mold was filled with the base material without causing wrinkles. The fiber flow ratio was 1.5, and the surface quality was good. Each layer $L_2$ found in a cross-section of the fiber-reinforced plastic satisfied the dispersion parameter. Further, there was a combination of layers $L_2$ in which the $D_1$ was not less than two times larger than the $D_2$.

Example 16

Prepreg $P_1$ was cut into a square of 200 mm×200 mm, to prepare a woven fabric prepreg. Subsequently, prepreg $P_2$ was cut into a square of 170 mm×170 mm, and incisions were made such that the incision length was 1 mm, such that the incision angle of the incisions with respect to the orientation direction of the reinforcing fibers was 14°, and such that the fiber length became 25 mm, to prepare an incised prepreg. First, the woven fabric prepreg was formed by placement along uneven portions of a mold whose surface temperature was room temperature, and then an incised prepreg laminate prepared by lamination into a laminate constitution of $[0°/90°]_{4S}$ was arranged on the woven fabric prepreg, to prepare a prepreg laminate. At this time, the woven fabric prepreg and the incised prepreg laminate were partially in contact with each other, but did not completely adhere to each other. The obtained prepreg laminate was arranged on a lower mold preliminarily heated to 130° C. After the arrangement of the prepreg laminate, an upper mold was attached thereto, followed by maintaining the temperature for 150 seconds for preheating. Thereafter, while the temperature of the molds was maintained at 130° C., pressurization using a pressing machine was carried out at a contact pressure of 5 MPa. Moldability evaluation $E_3$ was then carried out.

In this process, the calorific value condition was satisfied because Tb−Ta=159.3. All the relationships between the average length of the incisions made in the incised prepreg, x, and the average length of the discontinuous reinforcing fibers cut by the incisions, y, satisfied y≥6x+10. The area ratio $AR_1$ was 72%, and the area ratio $AR_2$ was 173%.

According to the result of evaluation of the fiber-reinforced plastic obtained, the mold was filled with the base material without causing wrinkles. The fiber flow ratio was 1.7, and the surface quality was good. Each layer $L_2$ found in a cross-section of the fiber-reinforced plastic satisfied the dispersion parameter. Further, there was a combination of layers $L_2$ in which the $D_1$ was not less than two times larger than the $D_2$.

Comparative Example 1

A prepreg laminate was produced in the same manner as in Example 2 except that prepreg $P_3$ was used instead of prepreg $P_2$, and that the preheating time was 30 seconds. Moldability evaluation $E_1$ was then carried out. The resins contained in prepreg $P_3$ were the same as the resins contained in prepreg $P_1$. Thus, Ta of the thermosetting resin A contained in the woven fabric prepreg and Tb of the thermosetting resin B contained in the incised prepreg did not satisfy the calorific value condition.

According to the result of evaluation, the fiber flow ratio of the fiber-reinforced plastic was 3.8, and disorder of the woven structure of the woven fabric prepreg was apparent, so that the surface quality was poor.

Comparative Example 2

A prepreg laminate was produced in the same manner as in Example 2 except that no incisions were made in prepreg $P_2$, and therefore that the preparation of an incised prepreg was not carried out. Moldability evaluation $E_1$ was then carried out.

According to the result of evaluation of the fiber-reinforced plastic obtained, the fiber flow ratio was 1.8. However, the mold was not completely filled with the base material.

Comparative Example 3

A prepreg laminate was produced in the same manner as in Example 2 except that the preheating step was not carried out. Moldability evaluation $E_1$ was then carried out. That is, after the arrangement of the prepreg laminate on the lower mold, the molding step was immediately started to produce a fiber-reinforced plastic.

According to the result of evaluation of the fiber-reinforced plastic obtained, the fiber flow ratio was 4.3, and disorder of the woven structure of the woven fabric was apparent, so that the surface quality was poor.

Comparative Example 4

A prepreg laminate was produced in the same manner as in Example 13 except that prepreg $P_3$ was used instead of prepreg $P_2$, and that the preheating time was 30 seconds. Moldability evaluation $E_2$ was then carried out.

According to the result of evaluation, the fiber flow ratio of the obtained fiber-reinforced plastic was 2.7, and disorder of the woven structure of the woven fabric prepreg was apparent, so that the surface quality was poor. A rib standing at a height of 7 mm was formed.

Comparative Example 5

A prepreg laminate was produced in the same manner as in Example 13 except that no incisions were made in prepreg $P_2$, and therefore that the preparation of an incised prepreg was not carried out. Moldability evaluation $E_2$ was then carried out.

According to the result of evaluation of the fiber-reinforced plastic obtained, the fiber flow ratio was 1.3. However, the rib height was 3 mm, and filling of the base material into the rib portion was extremely poor.

Comparative Example 6

A prepreg laminate was produced in the same manner as in Example 13 except that the preheating step was not carried out. Moldability evaluation $E_2$ was then carried out. That is, after the arrangement of the prepreg laminate on the lower mold, the molding step was immediately started to produce a fiber-reinforced plastic.

According to the result of evaluation of the fiber-reinforced plastic obtained, the fiber flow ratio was 4.3, and disorder of the woven structure of the woven fabric was apparent, so that the surface quality was poor.

Comparative Example 7

A prepreg laminate was produced in the same manner as in Example 15 except that prepreg $P_3$ was used instead of prepreg $P_2$, and that the preheating time was 30 seconds. Moldability evaluation $E_3$ was then carried out.

According to the result of evaluation, the fiber flow ratio of the obtained fiber-reinforced plastic was 2.7, and disorder of the woven structure of the woven fabric prepreg was apparent, so that the surface quality was poor.

Comparative Example 8

A prepreg laminate was produced in the same manner as in Example 15 except that no incisions were made in prepreg $P_2$, and therefore that the preparation of an incised prepreg was not carried out. Moldability evaluation $E_3$ was then carried out.

According to the result of evaluation, the obtained fiber-reinforced plastic bit wrinkles of the base material during the molding step, resulting in failure of the molding.

Comparative Example 9

A prepreg laminate was produced in the same manner as in Example 15 except that the preheating step was not carried out. Moldability evaluation $E_3$ was then carried out. That is, after the arrangement of the prepreg laminate on the lower mold, the molding step was immediately started to produce a fiber-reinforced plastic.

According to the result of evaluation of the fiber-reinforced plastic obtained, the fiber flow ratio was 4.3, and disorder of the woven structure of the woven fabric was apparent, so that the surface quality was poor.

TABLE 1

| Components of Resin Composition | | Resin Composition $C_1$ | Resin Composition $C_2$ | Resin Composition $C_3$ | Resin Composition $C_4$ | Resin Composition $C_5$ |
|---|---|---|---|---|---|---|
| Epoxy Resin | "jER ®"828 | 40 | 40 | 20 | 30 | 20 |
| | "jER ®"1007FS | 25 | 25 | 10 | 30 | 40 |
| | "Araldite ®"MY0600 | | | 30 | | 20 |
| | "SUMI-EPOXY ®"ELM434 | | | 30 | | 20 |
| | "EPICLON ®"N740 | 35 | 35 | | 40 | |
| Hardner | DICY7 | 3.5 | 2.6 | 4 | 3.4 | 3.8 |
| Curing Accelerator | "Omicure ®"24 | 2 | | | 2.5 | |
| | DCMU-99 | | 3 | 4 | | 4.8 |
| Thermoplastic Resin | "VINYLEC ®"K | 3 | 3 | | 3 | |
| | "SUMIKA EXCEL ®"PES5003P | | | 7 | | 8 |

TABLE 2

| Prepreg | Type | Reinforcing Fiber Carbon Fiber | Woven Structure (Filament numbers of Fiber Bundle) | Epoxy Resin Composition |
|---|---|---|---|---|
| $P_1$ | Woven Fabric Prepreg | T300 | Twill weave (3,000 filaments) | Resin Composition $C_1$ |
| $P_2$ | Single Direction Prepreg | T700S | — | Resin Composition $C_2$ |
| $P_3$ | Single Direction Prepreg | T700S | — | Resin Composition $C_1$ |
| $P_4$ | Single Direction Prepreg | T700S | — | Resin Composition $C_3$ |
| $P_5$ | Woven Fabric Prepreg | T1100G | Twill Weave (12,000 filaments) | Resin Composition $C_1$ |
| $P_6$ | Woven Fabric Prepreg | T300 | Plain Weave (1,000 filaments) | Resin Composition $C_4$ |
| $P_7$ | Woven Fabric Prepreg | T1100G | Satin Weave (12,000 filaments) | Resin Composition $C_5$ |

TABLE 3

| | Thermosetting Resin A | Thermosetting Resin B | Slit Parameter (x mm), Tb − Ta y (mm) | Area Ratio $AR_1$ (%) | Area Ratio $AR_2$ (%) | Molding Temperature (° C.) | Preheat Time (s) | Moldability Evaluation $E_1$ | Fiber Flowability | Remarks |
|---|---|---|---|---|---|---|---|---|---|---|
| Example 1 | Resin Composition $C_4$ | Resin Composition $C_1$ | 44.1 (1, 25) | 77 | 138 | 130 | 150 | fair | 3.5 | |
| Example 2 | Resin Composition $C_1$ | Resin Composition $C_2$ | 159.3 (1, 25) | 77 | 138 | 130 | 150 | good | 1.8 | |
| Example 3 | Resin Composition $C_1$ | Resin Composition $C_2$ | 159.3 (1, 12.5) | 77 | 138 | 130 | 150 | good | 2.1 | |
| Example 4 | Resin Composition $C_1$ | Resin Composition $C_2$ | 159.3 (1, 25) | 89 | 138 | 130 | 150 | good | 1.7 | |
| Example 5 | Resin Composition $C_1$ | Resin Composition $C_3$ | 146.6 (1, 25) | 81 | 493 | 130 | 150 | good | 2.0 | *1 |
| Example 6 | Resin Composition $C_1$ | Resin Composition $C_2$ | 159.3 (1, 25) | 77 | 138 | 140 | 120 | good | 1.9 | |
| Example 7 | Resin Composition $C_1$ | Resin Composition $C_2$ | 159.3 (1, 25) | 77 | 138 | 120 | 180 | good | 1.3 | |
| Example 8 | Resin Composition $C_1$ | Resin Composition $C_2$ | 159.3 (1, 25) | 77 | 138 | 130 | 150 | good | 1.5 | |
| Example 9 | Resin Composition $C_1$ | Resin Composition $C_2$ | 159.3 (1, 25) | 77 | 138 | 130 | 150 | good | 1.3 | |
| Example 10 | Resin Composition $C_4$ | Resin Composition $C_1$ | 44.1 (1, 25) | 77 | 138 | 130 | 150 | fair | 3.3 | |
| Example 11 | Resin Composition $C_5$ | Resin Composition $C_1$ | 46.4 (1, 25) | 77 | 138 | 130 | 150 | fair | 3.6 | |
| Example 12 | Resin Composition $C_1$ | Resin Composition $C_3$ | 146.6 (1, 25) | 77 | 138 | 130 | 150 | good | 2.5 | |
| Comparative Example 1 | Resin Composition $C_1$ | Resin Composition $C_1$ | 0 (1, 25) | 77 | 138 | 130 | 30 | fair | 3.8 | |
| Comparative Example 2 | Resin Composition $C_1$ | Resin Composition $C_2$ | 159.3 — | 77 | 138 | 130 | 150 | bad | 1.8 | *1 |
| Comparative Example 3 | Resin Composition $C_1$ | Resin Composition $C_2$ | 159.3 (1, 25) | 77 | 138 | 130 | 0 | fair | 4.3 | |

Note)
*1 Unable to fill substarate into the edge of the die

TABLE 4

| | Thermosetting Resin A | Thermosetting Resin B | Slit Parameter Tb − Ta (x mm), y (mm) | | Area Ratio $AR_1$ (%) | Area Ratio $AR_2$ (%) | Molding Temperature (° C.) | Preheat Time (s) | Moldability Evaluation $E_2$ | Fiber Flowability | Remarks |
|---|---|---|---|---|---|---|---|---|---|---|---|
| Example 13 | Resin Composition $C_1$ | Resin Composition $C_2$ | 159.3 | (1, 25) | 89 | 193 | 130 | 150 | good | 1.8 | *3 |
| Example 14 | Resin Composition $C_1$ | Resin Composition $C_2$ | 159.3 | Combined use of (1, 25) & (1, 12.5) | 89 | 193 | 130 | 150 | good | 1.7 | *4 |
| Comparative Example 4 | Resin Composition $C_1$ | Resin Composition $C_1$ | 0 | (1, 25) | 89 | 193 | 130 | 30 | fair | 2.7 | *3 |
| Comparative Example 5 | Resin Composition $C_1$ | Resin Composition $C_2$ | 159.3 | — | 89 | 193 | 130 | 150 | bad | 1.3 | *5 |
| Comparative Example 6 | Resin Composition $C_1$ | Resin Composition $C_2$ | 159.3 | (1, 25) | 89 | 193 | 130 | 0 | fair | 4.3 | *2 |

Note)
*2 a rib of 1.1 mm height stood.
*3 a rib of 7 mm height stood.
*4 a rib of 13 mm height stood.
*5 any rib did not stand.

TABLE 5

| | Thermosetting Resin A | Thermosetting Resin B | Slit Parameter Tb − Ta (x mm), y (mm) | | Area Ratio $AR_1$ (%) | Area Ratio $AR_2$ (%) | Molding Temperature (° C.) | Preheat Time (s) | Moldability Evaluation $E_3$ | Fiber Flowability | Remarks |
|---|---|---|---|---|---|---|---|---|---|---|---|
| Example 15 | Resin Composition $C_1$ | Resin Composition $C_2$ | 159.3 | (1, 25) | 89 | 173 | 130 | 150 | good | 1.5 | |
| Example 16 | Resin Composition $C_1$ | Resin Composition $C_2$ | 159.3 | (1, 25) | 72 | 173 | 130 | 150 | good | 1.7 | |
| Comparative Example 7 | Resin Composition $C_1$ | Resin Composition $C_1$ | 0 | (1, 25) | 89 | 173 | 130 | 30 | fair | 2.7 | |
| Comparative Example 8 | Resin Composition $C_1$ | Resin Composition $C_2$ | 159.3 | — | 89 | 173 | 130 | 150 | bad | — | *6 |
| Comparative Example 9 | Resin Composition $C_1$ | Resin Composition $C_2$ | 159.3 | (1, 25) | 89 | 173 | 130 | 0 | fair | 4.3 | |

Note)
*6 Unable to mold because of wrinkle biting

INDUSTRIAL APPLICABILITY

According to the present invention, a prepreg laminate that shows less disorder of the woven structure during molding even by combination of a woven fabric prepreg with a discontinuous fiber prepreg can be obtained. Therefore, a fiber-reinforced plastic suitable as an outer plate member can be obtained. Uses of such an outer plate member can be expanded to structural uses for aircraft, spacecraft, automobiles, railways, ships, electric appliances, sports, and the like.

DESCRIPTION OF SYMBOLS

1: Heat flow curve
2: Base line
3: Gross calorific value
4: Calorific value corresponding to 50% of gross calorific value
5: Incision
6: Lower mold
7: Upper mold
8: Prepreg laminate
9: Woven fabric prepreg
10: Discontinuous fiber prepreg
11: Warp
12: Weft
13: Minimum width of fiber bundle
14: Maximum width of fiber bundle
15: Fiber bundle at end of Layer $L_1$
Z: Rib height

The invention claimed is:

1. A prepreg laminate comprising: a woven fabric prepreg arranged on at least one surface layer; and a discontinuous fiber prepreg arranged;
   the woven fabric prepreg containing reinforcing fibers $R_1$ having a woven structure, and a thermosetting resin composition A,
   the discontinuous fiber prepreg containing unidirectionally oriented discontinuous reinforcing fibers $R_2$ and a thermosetting resin composition B,
   the thermosetting resin composition A and the thermosetting resin composition B, each comprising a thermosetting resin, a curing accelerator, a hardener, and a thermoplastic resin in amounts such that each of the thermosetting resin composition A and the thermosetting resin composition B satisfy the following calorific value condition:
   calorific value condition: when each of the thermosetting resin composition A and the thermosetting resin composition B is heated using a differential scanning calorimeter from 50° C. to 130° C. at 700° C./min under a nitrogen atmosphere followed by retention at 130° C. until completion of thermal curing reaction, $Tb - Ta > 150$ wherein
- Ta (s): time required for the calorific value of the thermosetting resin composition A to reach 50% of the gross calorific value of the thermosetting resin composition A;
- Tb (s): time required for calorific value of the thermosetting resin composition B to reach 50% of gross calorific value of the thermosetting resin composition B, wherein:
(i) the thermosetting resin composition A and the thermosetting resin composition B comprises different type of the curing accelerator, or
(ii) the thermosetting resin composition A and the thermosetting resin composition B comprises same type of the curing accelerator in a different content ratio to the thermosetting resin contained in each thermosetting resin composition.

2. The prepreg laminate according to claim 1, wherein the discontinuous fiber prepreg is an incised prepreg prepared by making plural incisions to a prepreg containing unidirectionally oriented reinforcing fibers and the thermosetting resin composition B, to form the reinforcing fibers into the discontinuous reinforcing fibers $R_2$.

3. The prepreg laminate according to claim 2, wherein substantially all the reinforcing fibers in the discontinuous fiber prepreg are cut by the incisions, and
the average length of the incisions, x in mm, and the average length of the discontinuous reinforcing fibers $R_2$ cut by the incisions, y in mm, satisfy y<6x+10.

4. The prepreg laminate according to claim 2, wherein substantially all the reinforcing fibers in the discontinuous fiber prepreg are cut by the incisions, and
the average length of the incisions, x in mm, and the average length of the discontinuous reinforcing fibers $R_2$ cut by the incisions, y in mm, satisfy y≥6x+10.

5. The prepreg laminate according to claim 1, wherein the surface area of each lamination plane in the discontinuous fiber prepreg is not less than 77% and less than 100% with respect to 100% of the surface area of the outer surface of the woven fabric prepreg arranged on at least one surface layer.

6. A method of producing a fiber-reinforced plastic using the prepreg laminate according to claim 1, the method comprising:
an arrangement step of arranging the prepreg laminate in a mold for molding;
a preheating step of preheating the prepreg laminate; and
a molding step of pressurizing and heating the prepreg laminate to prepare a fiber-reinforced plastic.

7. The method of producing a fiber-reinforced plastic according to claim 6, wherein, when one surface of the prepreg laminate is formed with the discontinuous fiber prepreg,
the plane of the mold for molding in contact with the discontinuous fiber prepreg has a surface area of more than 100% and less than 200% with respect to 100% of the surface area of the plane, in contact with the mold for molding, of the discontinuous fiber prepreg arranged on the surface.

8. The prepreg laminate according to claim 1, wherein the thermosetting resin composition A and the thermosetting resin composition B both are an epoxy resin composition.

9. A prepreg laminate comprising: a woven fabric prepreg arranged on at least one surface layer; and a discontinuous fiber prepreg arranged;
the woven fabric prepreg containing reinforcing fibers $R_1$ having a woven structure, and a thermosetting resin composition A,
the discontinuous fiber prepreg containing unidirectionally oriented discontinuous reinforcing fibers $R_2$ and a thermosetting resin composition B,
the thermosetting resin composition A and the thermosetting resin composition B, each comprising a thermosetting resin, a curing accelerator, a hardener, and a thermoplastic resin in amounts such that each of the thermosetting resin composition A and the thermosetting resin composition B satisfy the following calorific value condition:
calorific value condition: when each of the thermosetting resin composition A and the thermosetting resin composition B is heated using a differential scanning calorimeter from 50° C. to 130° C. at 700° C./min under a nitrogen atmosphere followed by retention at 130° C. until completion of thermal curing reaction, $$Tb-Ta>30$$

wherein
- Ta (s): time required for the calorific value of the thermosetting resin composition A to reach 50% of the gross calorific value of the thermosetting resin composition A;
- Tb (s): time required for calorific value of the thermosetting resin composition B to reach 50% of gross calorific value of the thermosetting resin composition B; and
- the surface area of each lamination plane in the discontinuous fiber prepreg is not less than 77% to 95% with respect to 100% of the surface area of the outer surface of the woven fabric prepreg arranged on at least one surface layer, wherein:
(i) the thermosetting resin composition A and the thermosetting resin composition B comprises different type of the curing accelerator, or
(ii) the thermosetting resin composition A and the thermosetting resin composition B comprises same type of the curing accelerator in a different content ratio to the thermosetting resin contained in each thermosetting resin composition.

* * * * *